United States Patent
Kiriyama

(10) Patent No.: US 12,445,152 B2
(45) Date of Patent: Oct. 14, 2025

(54) CORRECTION VALUE CALCULATION METHOD, CORRECTION VALUE CALCULATION PROGRAM, CORRECTION VALUE CALCULATION APPARATUS, AND ENCODER

(71) Applicant: MITUTOYO CORPORATION, Kanagawa (JP)

(72) Inventor: Tetsuro Kiriyama, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 18/755,835

(22) Filed: Jun. 27, 2024

(65) Prior Publication Data
US 2025/0023583 A1    Jan. 16, 2025

(30) Foreign Application Priority Data
Jul. 3, 2023    (JP) .................................. 2023-109451

(51) Int. Cl.
| H03M 13/00 | (2006.01) |
| G06F 17/17 | (2006.01) |
| H03M 13/13 | (2006.01) |
| H03M 13/25 | (2006.01) |

(52) U.S. Cl.
CPC .......... *H03M 13/251* (2013.01); *G06F 17/17* (2013.01); *H03M 13/13* (2013.01)

(58) Field of Classification Search
None
See application file for complete search history.

(56) References Cited

U.S. PATENT DOCUMENTS

| 2006/0076480 A1 | 4/2006 | Kiriyama et al. |
| 2006/0077083 A1 | 4/2006 | Kiriyama et al. |
| 2011/0134984 A1* | 6/2011 | Seo .................... G01B 9/02083 375/226 |
| 2014/0028478 A1* | 1/2014 | Mizoguchi ............. G01D 5/244 341/11 |

(Continued)

FOREIGN PATENT DOCUMENTS

| JP | 2006-112859 A | 4/2006 |
| JP | 2006-112862 A | 4/2006 |
| JP | 2007-327770 A | 12/2007 |

*Primary Examiner* — Mujtaba M Chaudry
(74) *Attorney, Agent, or Firm* — Rankin, Hill & Clark LLP

(57) ABSTRACT

A correction value calculation method calculates correction values to correct the 2-phase sinusoidal signals (X, Y) output by the encoder, and includes: a polar coordinate calculation step for calculating, for N phase angles and the Lissajous radius corresponding to each phase angle in the Lissajous waveform drawn by the 2-phase sinusoidal signals, a squared radius, which is the square of the Lissajous radius corresponding to each phase angle; and a correction value calculation step for calculating, based on each phase angle and corresponding squared radius, at least a correction residual of an offset error of the signal X, a correction residual of an offset error of the signal Y, a correction residual of an amplitude ratio error of the signals X and Y, and a correction residual of a phase difference error between the signal X and the signal Y, and then calculating correction values based on the correction residuals.

16 Claims, 14 Drawing Sheets

(56) References Cited

U.S. PATENT DOCUMENTS

2015/0076332 A1* 3/2015 Nagura .............. G01D 5/34784
  250/231.13
2017/0317618 A1* 11/2017 Mizoguchi ......... G01D 5/34707
2018/0172481 A1* 6/2018 Mochizuki ............. G01D 5/145

* cited by examiner

CORRECTION VALUE CALCULATION METHOD, CORRECTION VALUE CALCULATION PROGRAM, CORRECTION VALUE CALCULATION APPARATUS, AND ENCODER

CROSS-REFERENCE TO RELATED APPLICATION

This non-provisional application claims priority under 35 U.S.C. § 119 (a) from Japanese Patent Application No. 2023-109451, filed on Jul. 3, 2023, the entire contents of which are incorporated herein by reference.

BACKGROUND OF THE INVENTION

Field of the Invention

The present invention relates to a correction value calculation method, a correction value calculation program, a correction value calculation apparatus, and an encoder for correcting 2-phase sinusoidal signals.

Description of the Related Art

Conventionally, methods for correcting errors such as an offset error, an amplitude ratio error, and a phase difference error in the 2-phase sinusoidal signals output by the encoder are known.

For example, JP 2006-112862A describes an invention that detects the third harmonic component of 2-phase sinusoidal signals and calculates and corrects the offset error, the amplitude ratio error, and the phase difference error. In the invention described in JP 2006-112862A, the offset error and amplitude ratio error are obtained from the four zero-crossing points where the Lissajous waveform using 2-phase sinusoidal signals crosses the X or Y axis, so if the data used to calculate correction coefficients does not include data sampled around the zero crossing points, the error cannot be sufficiently reduced. The phase difference error is obtained from the four points where the Lissajous waveform using 2-phase sinusoidal signals intersects the straight lines y=x and y=−x. To reduce the error, it is necessary to sample near the points where the Lissajous waveform intersects the straight lines.

Here, the electromagnetic inductive type encoder requires more time for sampling than the photoelectric type encoder because it detects displacement by applying an AC signal. In addition, in low power consumption encoders, the sampling rate may be suppressed. Encoders with such low sampling rate may not be able to sample around desired points (e.g., zero-crossing points or points where the Lissajous waveform intersects y=x or y=−x), and errors may not be sufficiently reduced.

In addition, JP 2006-112859A discloses a method for detecting third harmonic components by Fourier analysis using data with a constant pitch. In this method, one rotation of the Lissajous signal is divided into uniform segments, and Fourier analysis is performed on all segments. With this method, if the sampling rate is low, it takes time to finish sampling all the segments, which reduces the update frequency of the Fourier analysis. This makes it difficult to employ Fourier analysis to detect the offset error, the amplitude ratio error, and the phase difference error.

JP 2007-327770A discloses a method of approximating 2-phase sinusoidal signals X and Y by the least-squares method to the expression of the sum of a sine wave and a cosine wave separately. To reduce interpolation error related to amplitude, it is necessary to set the amplitude ratio between 2-phase sinusoidal signals to 1. However, the method of JP 2007-327770A, which approximates the 2-phase sinusoidal signals separately by the least-squares method without considering their relative relationship, has a problem that the detection efficiency of the interpolation error related to the amplitude ratio is low.

SUMMARY OF THE INVENTION

Problems to be Solved by the Invention

In view of these circumstances, an objective of the present invention is to provide a correction value calculation method, a correction value calculation program, and a correction value calculation apparatus that can efficiently and accurately calculate correction coefficients for correcting interpolation errors in 2-phase sinusoidal signals by a simple method, and to provide an encoder equipped with such a correction value calculation apparatus.

Means for Solving the Problems

To solve the above problem, the correction value calculation method according to an embodiment of the present invention calculates correction values to correct 2-phase sinusoidal signals (X, Y) output by an encoder. The correction value calculation method includes: a polar coordinate calculation step for calculating, for N phase angles $\theta_i$ and the Lissajous radius $R_i$ corresponding to each phase angle $\theta_i$ in the Lissajous waveform drawn by the 2-phase sinusoidal signals, a squared radius $R_i^2$, which is the square of the Lissajous radius $R_i$ corresponding to each phase angle $\theta_i$; and a correction value calculation step for calculating, based on each phase angle $\theta_i$ and the squared radius $R_i^2$ corresponding to the phase angle $\theta_i$ calculated in the polar coordinate calculation step, at least a correction residual $\Delta C_x$ of an offset error $C_x$ of the signal X, a correction residual $\Delta C_y$ of an offset error $C_y$ of the signal Y, a correction residual $\Delta K_a$ of an amplitude ratio error $K_a$ of the signals X and Y, and a correction residual $\Delta P_y$ of a phase difference error $P_y$ between the signal X and the signal Y, and then calculating the correction values based on the correction residuals. The signals X and Y constitute the 2-phase sinusoidal signals. In the correction value calculation step, coefficients in the approximate expression model in which the squared radius $R^2$ is expressed by a trigonometric function including the phase angle $\theta$ as an argument are obtained by the least-squares method using each phase angle $\theta_i$ and the squared radius $R_i^2$ corresponding to each phase angle $\theta_i$, and the correction residuals are obtained from the obtained coefficients.

The program according to the embodiment of the present invention causes the computer to execute the correction value calculation method described above.

The correction value calculation apparatus according to an embodiment of the present invention calculates correction values to correct 2-phase sinusoidal signals (X, Y) output by an encoder. The correction value calculation apparatus includes: a polar coordinate conversion unit that calculates, for N phase angles $\theta_i$ and the Lissajous radius $R_i$ corresponding to each phase angle $\theta_i$ in the Lissajous waveform drawn by the 2-phase sinusoidal signals, the squared radius $R_i^2$, which is the square of the Lissajous radius $R_i$ corresponding to each phase angle $\theta_i$; and an error detection unit that calculates, based on each phase angle $\theta_i$ and the squared radius $R_i^2$ corresponding to the phase angle $\theta_i$ calculated by the polar coordinate conversion unit, at least a correction residual $\Delta C_x$ of an offset error $C_x$ of the signal X, a correction residual $\Delta C_y$ of an offset error $C_y$ of the signal Y, a correction residual $\Delta K_a$ of an amplitude ratio error $K_a$ of the signals X and Y, and a correction residual $\Delta P_y$ of a phase difference error $P_y$ between the signal X and the signal Y, and then calculating correction values based on the correction residuals, wherein the signals X and Y constitute the 2-phase sinusoidal signals. The error detection unit obtains coefficients in the approximate expression model in which the squared radius $R^2$ is expressed by a trigonometric function including the phase angle $\theta$ as an argument by the least-squares method using each phase angle $\theta_i$ and the squared radius $R_i^2$ corresponding to each phase angle $\theta_i$, and obtains the correction residuals from the obtained coefficients.

The encoder according to the embodiment of the present invention includes the correction value calculation apparatus described above and the encoder detection unit that outputs 2-phase sinusoidal signals in response to displacement along the measurement direction. The correction value calculation apparatus performs a correction value calculation process that calculates correction values based on the 2-phase sinusoidal signals output by the encoder detection unit, and a correction process that applies the calculated correction values to the 2-phase sinusoidal signals output by the encoder detection unit.

DETAILED DESCRIPTION OF THE EMBODIMENTS

First Embodiment

In the following, the first embodiment will be described on the basis of FIGS. 1 to 8.

Figure 1:
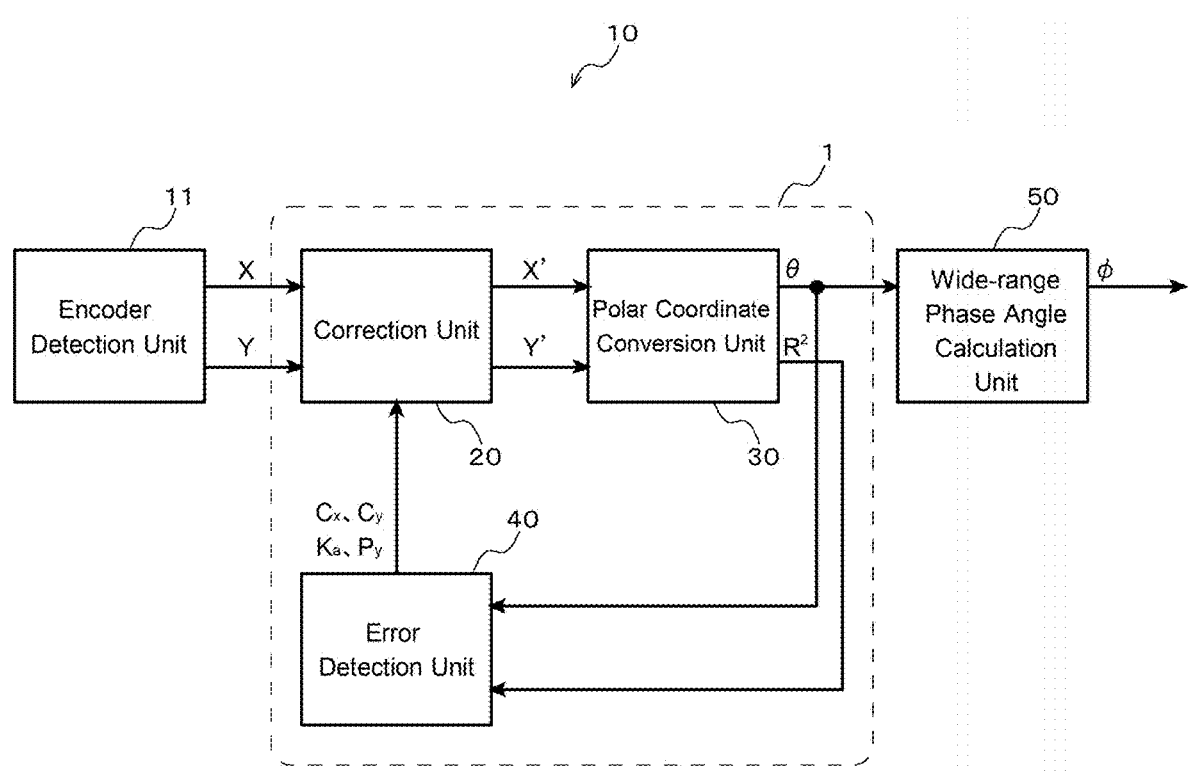
FIG. 1 is a block diagram showing the basic configuration of the correction value calculation apparatus 1 of the first embodiment, together with an encoder detection unit 11 and a wide-range phase angle calculation unit 50 in the encoder 10.

A correction value calculation apparatus 1 calculates correction values to correct 2-phase sinusoidal signals at an encoder 10. FIG. 1 is a block diagram showing the basic configuration of the correction value calculation apparatus 1 of the first embodiment, together with an encoder detection unit 11 and a wide-range phase angle calculation unit 50 in the encoder 10.

In the example shown in FIG. 1, the correction value calculation apparatus 1 is implemented in the form of being built into the encoder 10 together with the encoder detection unit 11 and the wide-range phase angle calculation unit 50. In the present embodiment, encoder 10 includes the encoder detection unit 11, which outputs 2-phase sinusoidal signals in response to displacement along the measurement direction, the correction value calculation apparatus 1, and the wide-range phase angle calculation unit 50 which calculates the wide-range phase angle φ, which is the final output of the encoder 10, from the phase angle θ calculated by the correction value calculation apparatus 1. The wide-range phase angle φ corresponds to, for example, the rotational displacement of the rotary encoder. The correction value calculation apparatus 1 includes a correction unit 20, an error detection unit 40, and a polar coordinate conversion unit 30. The correction value calculation apparatus 1 performs a correction value calculation process that calculates correction values based on the 2-phase sinusoidal signals output by the encoder detection unit 11, and a correction process that applies the correction values calculated in advance to the 2-phase sinusoidal signals output by the encoder detection unit 11. In such an implementation form built into the encoder 10, the correction value calculation apparatus 1 can dynamically update the correction values while detecting displacement if the correction values can be calculated quickly enough.

As another implementation form of the correction value calculation apparatus 1, the correction value calculation apparatus 1 may be implemented as a separate unit from the encoder 10. For example, the correction value calculation apparatus 1 can be realized by a computer that is separate from the encoder detection unit 11. When the encoder detection unit 11 is installed at the displacement measurement point, the correction value calculation apparatus 1 may acquire the data of 2-phase sinusoidal signals acquired by the encoder detection unit 11 in the installed state via communication means or a storage medium and calculate the correction values based on the acquired data. The calculated correction values may then be provided to the encoder detection unit 11 via the communication means or the storage medium.

The encoder detection unit 11 can use any detection principle, but may be, for example, photoelectric type, magnetic type, electromagnetic induction type, or the like. Using the 2-phase sinusoidal signals output by the encoder detection unit 11 (for example, with X as the horizontal axis and Y as the vertical axis), a Lissajous waveform can be drawn. Ideally, the Lissajous waveform should have a constant Lissajous radius R regardless of the phase angle θ. However, the 2-phase sinusoidal signals output from the encoder detection unit 11 usually contains errors such as amplitude errors, phase difference errors, and offsets, so the Lissajous radius R is not constant regardless of the phase angle θ.

The analog 2-phase sinusoidal signal output by the encoder detection unit 11 is sampled and digitized at a predetermined frequency by AD converters not shown. In this specification, this group of digitized 2-phase sinusoidal signal data is referred to simply as "2-phase sinusoidal signals X and Y". The digitized 2-phase sinusoidal signals X and Y are represented using a common index such as "2-phase sinusoidal signals $X_i$ and $Y_i$," to explicitly indicate the individual data sampled simultaneously, if necessary. In this specification, the digital data of 2-phase sinusoidal signals X and Y are described as a pair of N points when calculating the correction values. That is, in the data of 2-phase sinusoidal signals $X_i$ and $Y_i$ used to calculate the correction values, i is an integer in the range 0 to N−1. Other parameters calculated from the "2-phase sinusoidal signals $X_i$ and $Y_i$ are also expressed using the index as necessary, such as the squared radius $R_i^2$ and phase angle $\theta_i$.

The 2-phase sinusoidal signals X and Y are input to the correction unit 20. The correction unit 20 holds the correction values to be applied to the 2-phase sinusoidal signals. The correction values are calculated by the error detection unit 40. The correction unit 20 corrects the 2-phase sinusoidal signals X and Y using the correction values and outputs output signals X' and Y'. The output signals X' and Y' of the correction unit 20 are input to the polar coordinate conversion unit 30.

The correction unit 20 corrects the 2-phase sinusoidal signals X and Y using offset errors in the orthogonal direction (i.e., offset error $C_x$ for X and offset error $C_y$ for Y), an amplitude ratio error in the orthogonal direction ($K_a = A_y/A_x$), and a phase difference error between X and Y ($P_y$) as the correction values. The 2-phase sinusoidal signals X and Y with various errors are expressed as in Equation (1).

$$X = A_x \cos\theta + C_x \quad (1)$$
$$Y = A_y \sin(\theta + P_y) + C_y$$

As a specific example of a method of applying the correction values, the correction unit 20 may apply the correction values to the 2-phase sinusoidal signals $X_i$ and $Y_i$ according to Equation (2) to obtain the output signals (corrected 2-phase sinusoidal signals) $X_i'$ and $Y_i'$.

$$X_i' = K_a(X_i - C_x) \quad (2)$$
$$Y_i' = Y_i - C_y - P_y X_i$$

In the initial state when the correction values are not calculated by the error detection section 40, the correction section 20 may output the 2-phase sinusoidal signals $X_i$ and $Y_i$ as they are, as output signals $X_i'$ and $Y_i'$. Alternatively, the output signals $X_i'$ and $Y_i'$ may be output using predetermined initial correction values. For example, if the initial correction values are $C_x=0$, $C_y=0$, $K_a=1$, and $P_y=0$, then in the initial state when the correction values are not calculated by the error detection unit 40, substantively no correction is performed and the 2-phase sinusoidal signals $X_i$ and $Y_i$ are output without change as output signals $X_i'$ and $Y_i'$.

The polar coordinate conversion unit 30 calculates the phase angle $\theta_i$ and the squared radius $R_i^2$, which is the square of the Lissajous radius $R_i$ corresponding to the phase angle $\theta_i$, from the output signals $X_i'$ and $Y_i'$ of the correction unit 20 by the calculations in Equations (3) and (4).

$$R_i^2 = X_i'^2 + Y_i'^2 \tag{3}$$

$$\theta_i = \tan^{-1}\frac{Y_i'}{X_i'} \tag{4}$$

The wide-range phase angle calculation unit 50 calculates for each phase angle $\theta_i$ a wide-range phase angle $\varphi_i$ that represents a wide-range displacement exceeding a displacement corresponding to one cycle of the 2-phase sinusoidal signals. The wide-range phase angle $\varphi_i$ can be obtained by a known method from the number of cycles (the number of Lissajous signal rotations) of the 2-phase sinusoidal signals from the reference displacement (origin) $n_i$ and the phase angle $\theta_i$ calculated by the polar coordinate conversion unit 30. For example, in the case of an encoder that has 100 cycles of 2-phase sinusoidal signals in one cycle (0 to 360 degrees) of the wide-range phase angle $\varphi$, $\varphi_i$ can be mutually transformed with $n_i$ and $\theta_i$ by the relation $\varphi_i = (n_i \times 360 + \theta_i)/100$. The number of rotations $n_i$ of the Lissajous signal can be counted by a known incremental up-down counter (upper counter). The wide-range phase angle $\varphi_i$ calculated by the wide-range phase angle calculation unit 50 is the final output of the encoder 10.

The error detection unit 40 calculates the correction values based on the phase angle $\theta_i$ and the squared radius $R_i^2$ calculated by the polar coordinate conversion unit 30. The error detection unit 40 calculates at least the offset errors in the orthogonal direction of the 2-phase sinusoidal signals ($C_x$ and $C_y$), the amplitude ratio error ($K_a$), and the phase difference error ($P_y$) as the correction values and gives them to the correction unit 20.

Specifically, the error detection unit 40 determines the coefficients $A_{c1}$, $A_{s1}$, and $R_{o1}$ in the approximate expression models (Equations (5) and (6)) that represent the squared radius $R^2$ using trigonometric functions that include the phase angle $\theta$ as an argument, by the least-squares method using each of the phase angles $\theta$ and the corresponding squared radius $R^2$.

$$R^2 = A_{c1}\cos\theta + A_{s1}\sin\theta + R_{o1} \tag{5}$$

$$R^2 = A_{c2}\cos 2\theta + A_{s2}\sin 2\theta + R_{o2} \tag{6}$$

For example, the error detection unit 40 can use equation (5) as the approximate expression model to create a three-variable simultaneous linear equation for $R_i^2$ and $\theta_i$, and each coefficient in Equation (5) can be obtained as an element of the $C_1$ matrix by Equation (7).

$$A_1 = \begin{bmatrix} \sum\cos^2\theta_i & \sum\sin\theta_i\cos\theta_i & \sum\cos\theta_i \\ \sum\cos\theta_i\sin\theta_i & \sum\sin^2\theta_i & \sum\sin\theta_i \\ \sum\cos\theta_i & \sum\sin\theta_i & N \end{bmatrix} \tag{7}$$

$$B_1 = \begin{bmatrix} \sum R_i^2\cos\theta_i \\ \sum R_i^2\sin\theta_i \\ \sum R_i^2 \end{bmatrix}$$

$$C_1 = \begin{bmatrix} A_{c1} \\ A_{s1} \\ R_{o1} \end{bmatrix}$$

$$A_1 \cdot C_1 = B_1$$

$$C_1 = A_1^{-1} \cdot B_1$$

The error detection unit 40 can use Equation (6) as the approximate expression model to create a three-variable simultaneous linear equation for $R_i^2$ and $2\theta_i$, and each coefficient in Equation (6) can be obtained as an element of the $C_2$ matrix by equation (8).

$$A_2 = \begin{bmatrix} \sum\cos^2 2\theta_i & \sum\sin 2\theta_i\cos 2\theta_i & \sum\cos 2\theta_i \\ \sum\cos 2\theta_i\sin 2\theta_i & \sum\sin^2 2\theta_i & \sum\sin 2\theta_i \\ \sum\cos 2\theta_i & \sum\sin 2\theta_i & N \end{bmatrix} \tag{8}$$

$$B_2 = \begin{bmatrix} \sum R_i^2\cos 2\theta_i \\ \sum R_i^2\sin 2\theta_i \\ \sum R_i^2 \end{bmatrix}$$

$$C_2 = \begin{bmatrix} A_{c2} \\ A_{s2} \\ R_{o2} \end{bmatrix}$$

$$A_2 \cdot C_2 = B_2$$

$$C_2 = A_2^{-1} \cdot B_2$$

The error detection unit 40 then calculates correction values (i.e., the correction residuals remaining in the 2-phase sinusoidal signals) from the obtained coefficients using Equations (9) through (12).

$$\Delta C_x = A_{c1}/2 \tag{9}$$

$$\Delta C_y = A_{s1}/2 \tag{10}$$

$$\Delta K_a = \sqrt{1 - 2A_{c2}} \tag{11}$$

$$\Delta P_y = A_{s2} \tag{12}$$

The reason why the offset error $C_x$ of X is obtained in Equation (9) can be explained as follows. That is, if there is only the offset error $C_x$ for X in Equation (1), then X and Y are expressed in Equation (13).

$$X = A\cos\theta + C_x \tag{13}$$

$$Y = A\sin\theta$$

Therefore, the squared radius $R^2$ is expressed by Equation (14).

$$R^2 = X^2 + Y^2$$
$$= (A\cos\theta + C_x)^2 + (A\sin\theta)^2$$
$$= 2AC_x\cos\theta + A^2(\cos^2\theta + \sin^2\theta)$$
$$= 2AC_x\cos\theta + A^2 \quad (14)$$

By comparing the coefficients of cos θ in Equations (5) and (14), the relationship in Equation (9) is obtained. The reason why the offset error $C_y$ of Y is obtained in Equation (10) can be explained in the same manner.

The reason why the amplitude ratio error $K_a$ is obtained in Equation (11) can be explained as follows. That is, if $A_x \neq A_y$ is true in Equation (1), $K_a$ is expressed as $K_a = A_y/A_x$, and there are no other errors, the square radius $R^2$ is expressed in Equation (15).

$$R^2 = \frac{1}{2}(1 - K_a^2)A_x^2 \cos 2\theta + \frac{1}{2}(1 + K_a^2)A_x^2 \quad (15)$$

By comparing the coefficients of cos 2θ in Equations (15) and (6), the relationship in Equation (11) is obtained.

The reason why the phase difference error $P_y$ is obtained in Equation (12) can be explained as follows. If there is only the phase difference error $P_y$ in Equation (1), then the squared radius $R^2$ is expressed in Equation (16).

$$R^2 = A^2 + \frac{A^2}{2}(1 - \cos 2P_y)\cos 2\theta + \frac{A^2}{2}\sin 2P_y \sin 2\theta \quad (16)$$

When $P_y \approx 0$, Equation (16) can be approximated as in Equation (17) because cos $2P_y \approx 1$.

$$R^2 \simeq A^2 + \frac{A^2}{2}\sin 2P_y \sin 2\theta \quad (17)$$

Furthermore, since sin $2P_y \approx 2P_y$ is established in the vicinity of $P_y = 0$, the relationship in Equation (18) can be derived.

$$R^2 \simeq A^2 + A^2 P_y \sin 2\theta \quad (18)$$

By comparing the coefficients of sin 2θ in Equation (6) and Equation (18) with amplitude A=1 in Equation (18), the relationship in Equation (12) is obtained.

Figure 2:
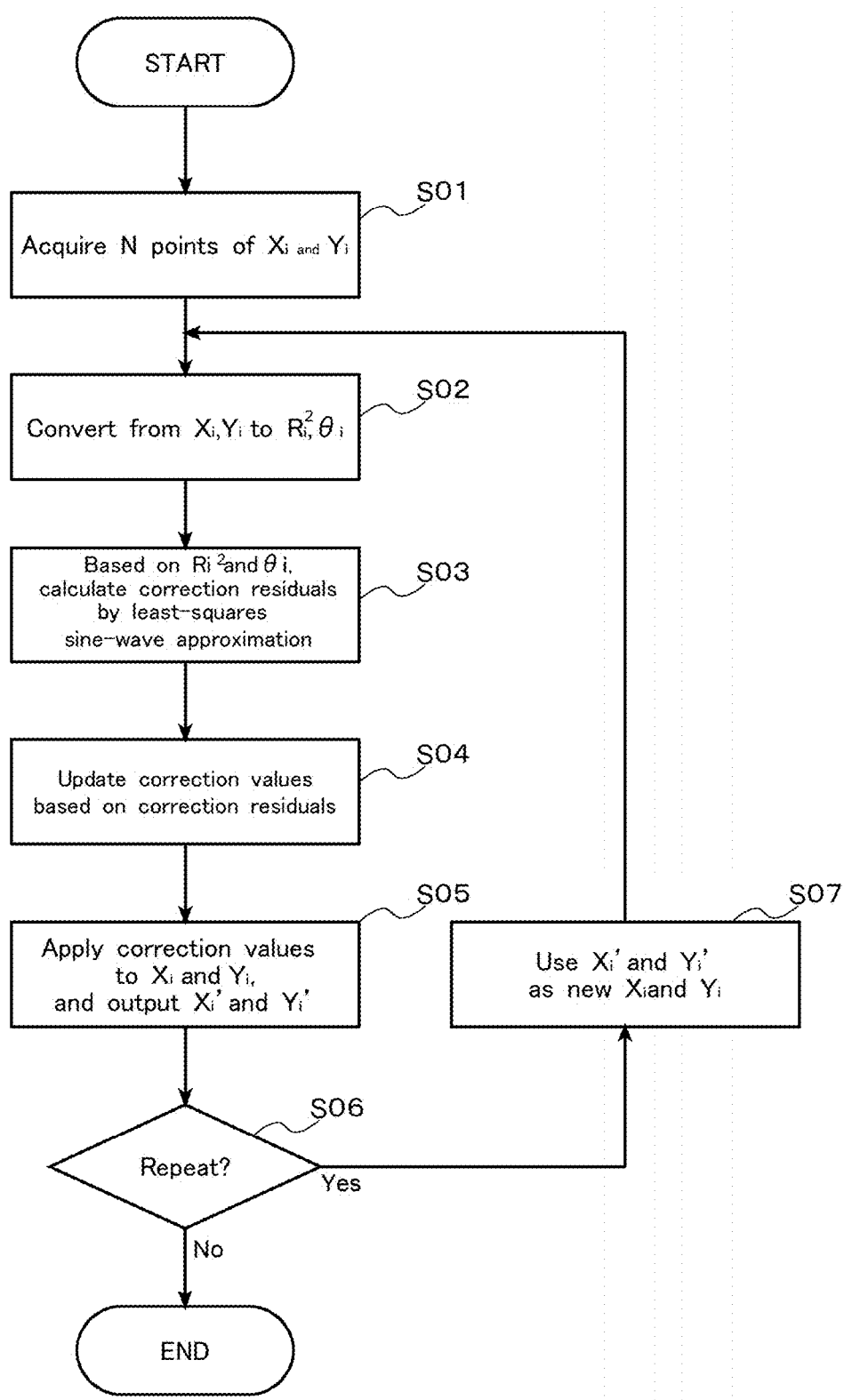
FIG. 2 is a flowchart showing the procedure of the correction value calculation process in the first embodiment.

Next, the correction value calculation process, in which correction values are calculated using the correction value calculation apparatus 1 configured in the above manner, will be described. FIG. 2 is a flowchart showing the procedure of the correction value calculation process in the first embodiment. The correction value calculation process is performed by the correction unit 20, the polar coordinate conversion unit 30, and the error detection unit 40. In the correction value calculation process, the offset error $C_x$ of X, the offset error $C_y$ of Y, the amplitude ratio error $K_a$, and the phase difference error $P_y$ are obtained from X and Y. These errors obtained serve as the correction values and are used to remove the effect of the errors from the 2-phase sinusoidal signals X and Y output from the encoder detection unit 11.

The 2-phase sinusoidal signals X and Y with the offset errors $C_x$ and $C_y$, the amplitude ratio error $K_a$, and the phase difference error $P_y$ can be expressed in the same manner as in Equation (1) as described above. In Equation (1), $C_x=0$, $C_y=0$, $K_a=A_y/A_x=1$, and $P_y=0$ are the states with the smallest errors.

When the correction value calculation process is started, the correction unit 20 first acquires N pairs of digital data of 2-phase sinusoidal signals X and Y ($X_i$, $Y_i$; where i is 0 to N−1) as output data of the encoder detection unit 11 for correction (step S01). The correction unit 20 may acquire this data in real-time from the encoder detection unit 11, or the encoder detection unit 11 may acquire and record the data in advance, which is then acquired by the correction unit 20 via communication means or a storage medium.

Then, the polar coordinate conversion unit 30 calculates the phase angle $\theta_i$ and the corresponding squared radius $R_i^2$ for each of the N data pairs of the 2-phase sinusoidal signals (step S02).

Then, based on each phase angle $\theta_i$ and squared radius $R_i^2$ calculated in step S02, the error detection unit 40 calculates the correction residuals of the offset errors ($\Delta C_x$ and $\Delta C_y$) in the orthogonal direction of the 2-phase sinusoidal signals, the correction residual of the amplitude ratio error ($\Delta K_a$), and correction residual of phase difference error ($\Delta P_y$), which are remaining in the 2-phase sinusoidal signals X and Y input in the step S01, are calculated (Step S03).

Then, the correction values held by the correction unit 20 are updated based on the calculated correction residuals for the respective errors (step S04). The error detection unit 40 may update correction values using a predetermined feedback gain $G_f$ (where $0 < Gf \leq 1$), according to Equation (19). When updating the correction values using Equation (19), if the feedback gain $G_f$ is set to $G_f < 1$, the effect of the correction residuals is prevented from being excessively reflected in the correction values, and the correction residuals can be easily converged to values with small errors (0 for $\Delta C_x$, $\Delta C_y$, and $\Delta P_y$ and 1 for $\Delta K_a$).

$$C_x = C_x + G_f \cdot \Delta C_x \quad (19)$$
$$C_y = C_y + G_f \cdot \Delta C_y$$
$$K_a = K_a + G_f \cdot (\Delta K_a - 1)$$
$$P_y = P_y + G_f \cdot \Delta P_y$$

where $$0 < G_f \leq 1.$$

If step 03 is performed for the first time in the correction value calculation process, the update based on the calculated correction residuals may be applied to the predetermined initial values for correction values (e.g., $C_x=0$, $C_y=0$, $K_a=1$, and $P_y=0$).

The correction unit 20 then corrects the 2-phase sinusoidal signals based on the correction values calculated by the error detection unit 40 and outputs the signals $X_i'$ and $Y_i'$ (step S05).

If the calculation of correction values is repeated (step S06; Yes), the 2-phase sinusoidal signals $X_i'$ and $Y_i'$ corrected in step S05 are used as new 2-phase sinusoidal signals $X_i$ and $Y_i$ (step S07), and processing returns to step S02. Steps S02 through S05 are repeated as many times as necessary, and when repetition is no longer necessary (step S06; No), the correction value calculation process ends. The correction values at the end of the correction value calculation process are the final correction values. The number of times the correction values are repeatedly calculated and updated may be a predetermined number. Alternatively, the process may be repeated until the correction residuals are sufficiently small (e.g., below a predetermined threshold). In such a correction value calculation process, operations to calculate and update correction values based on the initial 2-phase sinusoidal signals $X_i$ and $Y_i$ are applied cumulatively, and the correction residuals converge to values with small errors (0 for $\Delta C_x$, $\Delta C_y$, and $\Delta P_y$ and 1 for $\Delta K_a$).

Then, the simulation conducted to confirm the effectiveness of the correction value calculation process by the correction value calculation apparatus 1 will be described.

In conducting the simulation, 32 points of 2-phase sinusoidal signals $X_i$ and $Y_i$ (that is, N=32) with errors of $C_x$=0.1, $C_y$=0.05, $A_x$=0.95, $A_y$=1.05, and $P_y$=−0.04 were randomly generated as data to which the correction value calculation process was applied. The correction value calculation process of the first embodiment was then applied to the 32-point data. The cumulative number of times the correction is applied (the number of repetitions of steps S02 to S05) M is set to 30.

Figure 3:
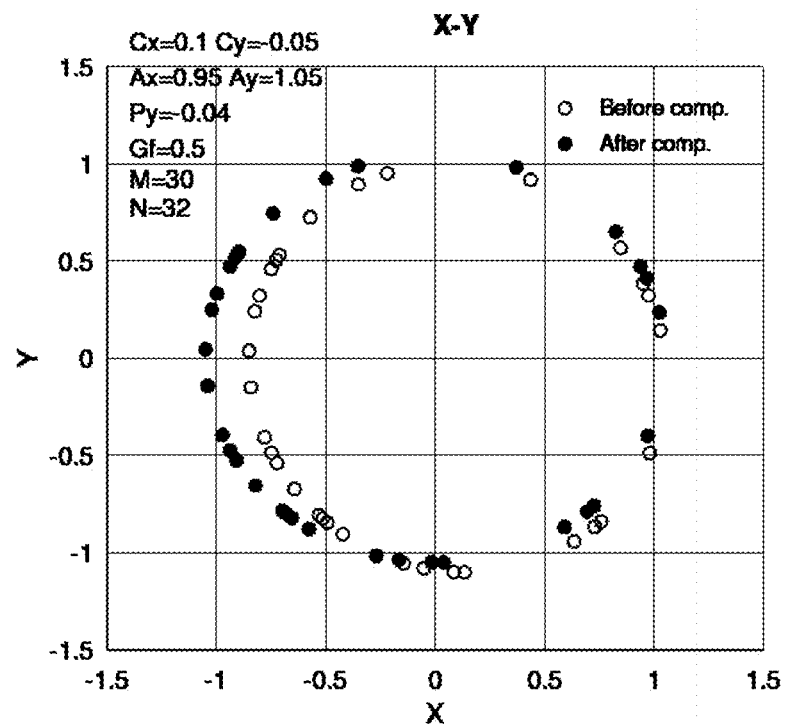
FIG. 3 is a graph plotting the 2-phase sinusoidal signals $X_i$ and $Y_i$ before and after correction as Lissajous waveforms with respect to the correction value calculation apparatus 1 of the first embodiment.
Figure 4:
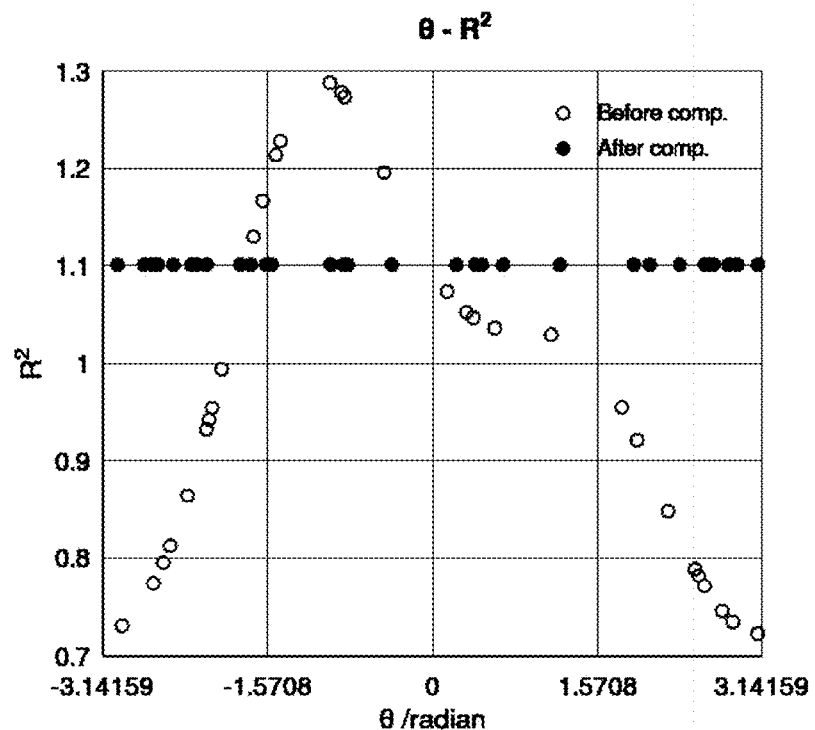
FIG. 4 is a graph plotting the phase angle $\theta_i$ and the squared radius $R_i^2$ obtained by converting the 2-phase sinusoidal signals $X_i$ and $Y_i$ before and after correction, with the horizontal axis representing $\theta$ and the vertical axis representing $R^2$, for the correction value calculation apparatus 1 in the first embodiment.
Figure 5:
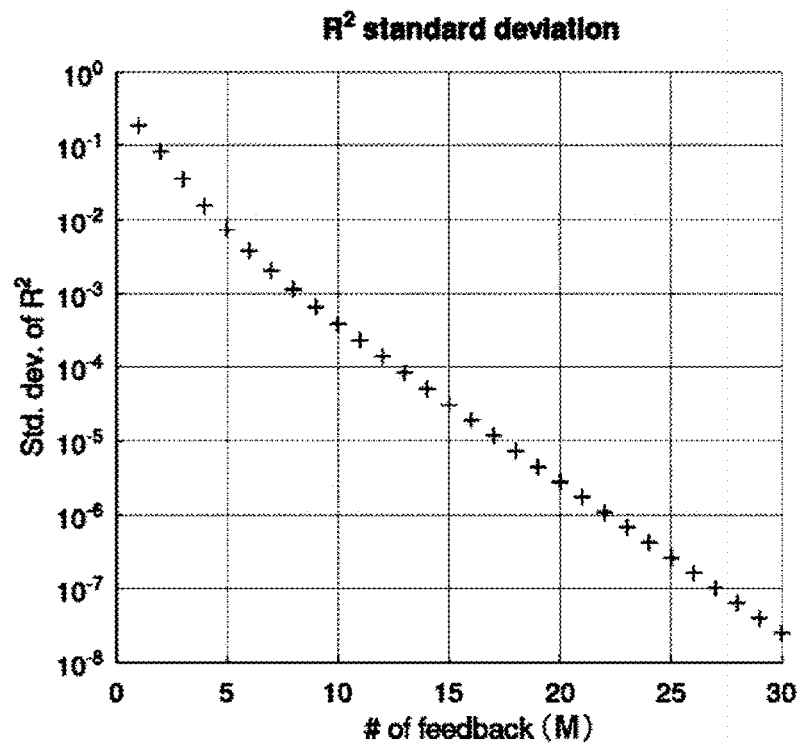
FIG. 5 is a graph plotting the standard deviation of $R^2$ for the correction value calculation apparatus 1 of the first embodiment, with the horizontal axis representing the cumulative number of times M that the correction value calculation is applied.
Figure 6:
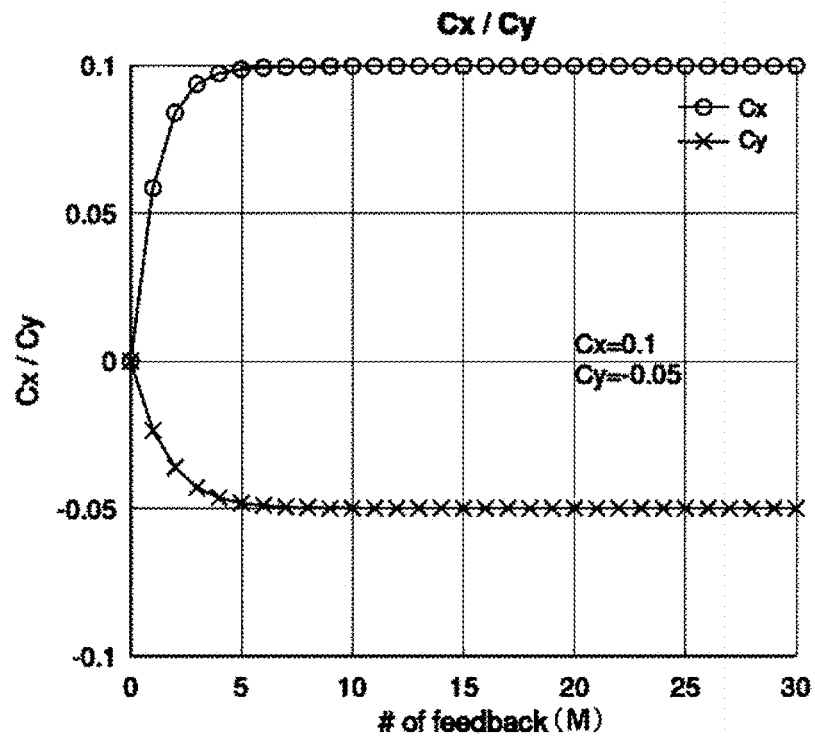
FIG. 6 is a graph plotting the offset errors $C_x$ and $C_y$ for the correction value calculation apparatus 1 of the first embodiment, with the horizontal axis representing the cumulative number of times M that the correction value calculation is applied.
Figure 7:
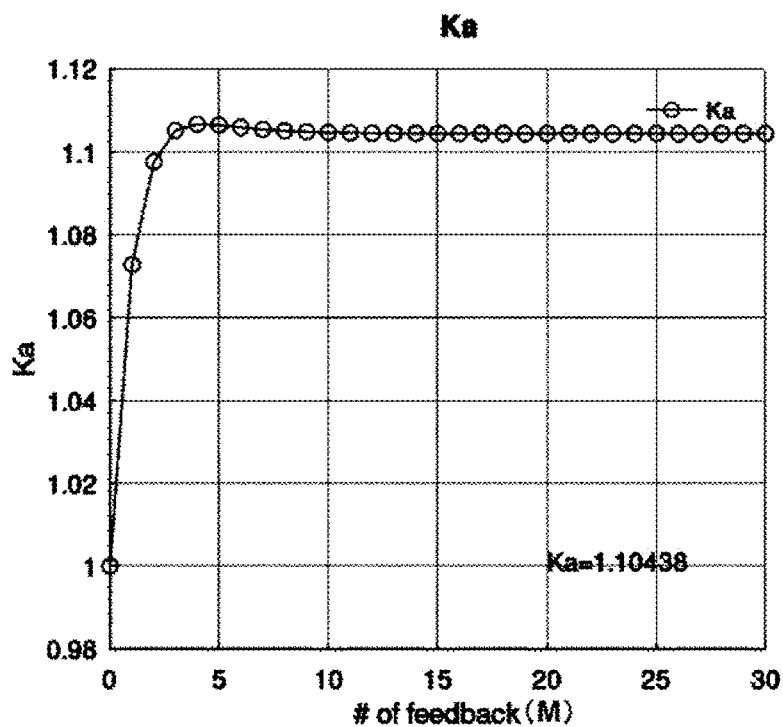
FIG. 7 is a graph plotting the amplitude ratio error $K_a$ for the correction value calculation apparatus 1 of the first embodiment, with the horizontal axis representing the cumulative number of times M that the correction value calculation is applied.
Figure 8:
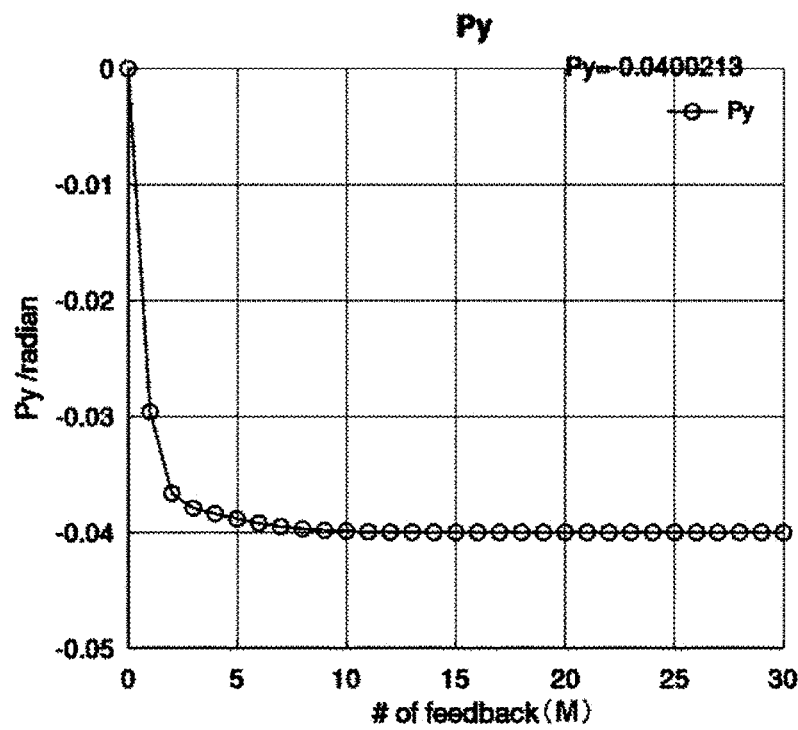
FIG. 8 is a graph plotting the phase difference error $P_y$ for the correction value correction value calculation apparatus 1 of the first embodiment, with the horizontal axis representing the cumulative number of times M that the correction value calculation is applied.

FIG. 3 is a graph plotting the 2-phase sinusoidal signals $X_i$ and $Y_i$ before and after correction as Lissajous waveforms. FIG. 4 is a graph plotting the phase angle $\theta_i$ and the squared radius $R_i^2$ obtained by converting the 2-phase sinusoidal signals $X_i$ and $Y_i$ before and after correction, with the horizontal axis representing $\theta$ and the vertical axis representing $R^2$. From these graphs, it can be seen that $R^2$ is constant due to the correction and that close to ideal 2-phase sinusoidal signals $X_i$ and $Y_i$ are obtained.

FIGS. 5-8 are graphs plotting the standard deviation of $R^2$ and errors of $C_x$, $C_y$, $K_a$, and $P_y$ to confirm the effect of cumulative application of corrections, with the horizontal axis representing the cumulative number of times M that the correction value calculation is applied. The standard deviation of $R^2$ shown in FIG. 5 becomes smaller as the cumulative number of times M that the correction value calculation is applied increases, confirming that the variation of $R^2$ disappears with the cumulative application of the correction value calculation. For each of the errors shown in FIGS. 6-8, it can be seen how they converge to the error values set when generating the data for the 2-phase sinusoidal signals $X_i$ and $Y_i$. It can be seen that the number of times of cumulative application M=10 times is sufficient for convergence.

According to the correction value calculation apparatus 1 and the correction value calculation process of the first embodiment described above, the correction values can be obtained using the squared radius $R^2$ instead of the radius R. Therefore, the calculation to obtain the square root is unnecessary, the correction values can be obtained with high accuracy and efficiency in a simple method, and correction can be performed. In particular, by applying the correction value calculation cumulatively, highly accurate correction values can be obtained. In addition, since a master encoder, which serves as a reference for correction, is not required and correction values can be obtained from unequal pitch data, there is no need to use a high-precision feed mechanism or control to acquire the two-phase sinusoidal signal data used to obtain the correction values, thereby reducing costs. Furthermore, the correction values can be obtained from a smaller number of data points than with conventional methods. Therefore, calculations can be made faster while suppressing computing resources.

Second Embodiment

The second embodiment of the present invention will now be described below. This second embodiment performs the correction value calculation process at a higher speed with fewer operations than the first embodiment. Since the configuration of the correction value calculation apparatus 1 is the same as that of the first embodiment, the following describes mainly the operations in the correction value calculation process of the second embodiment.

In the first embodiment above, Equations (7) and (8) were used to obtain the coefficients in the approximate expression models (Equations (5) and (6)) that represent the squared radius $R^2$ using trigonometric functions that include the phase angle $\theta$ as arguments. These equations include sin and cos operations. The operations of sin and cos are realized by high-order polynomials in embedded digital signal processing devices such as microcontrollers, DSPs, and FPGAs, and the accuracy of the operations depends on the order of the polynomial. For example, to obtain an accuracy of less than 1 LSB in a typical Q14 format fixed-point operation using the polynomial of the Maclaurin expansion of sine, a polynomial operation of the 11th order is required. Performing high-order polynomial operations for N $\theta_i$ increases required computing resources and computing time, making it difficult to implement in small, lightweight digital signal processing devices such as those embedded in encoders.

Therefore, in the present embodiment, the sin and cos operations are replaced with operations that require less number of calculations. In the range where the error is sufficiently small, $x_i$ and $y_i$, which are the 2-phase sinusoidal signals $X_i$ and $Y_i$ divided by the amplitude A, can be approximated as in Equation (20). A high-precision encoder has the amplitude $A_x$ of the signal X and the amplitude $A_y$ of the signal Y close to each other even before correction. They are also close to the design nominal value of the amplitude, $A_{nom}$. Therefore, with the common (averaged) amplitude of signals X and Y as A, cos $\theta_i$ is approximated to $x_i$, and sin $\theta_1$ is approximated to $y_i$ by Equation (20).

$$X_i/A = \cos \theta_i \equiv x_i \quad (20)$$
$$Y_i/A = \sin \theta_i \equiv y_i$$

Thus, under the constraint of using a high-precision encoder whose error is small enough that the approximation in Equation (20) can be applied even before correction, the amount of calculation is reduced by replacing the trigonometric operations of the phase angle $\theta_i$ with operations of $x_i$ and $y_i$. In order for the error detection unit 40 to perform operations using $x_i$ and $y_i$, the polar coordinate conversion unit 30 of the second embodiment calculates $x_i$ and $y_i$, which substantially represent the phase angle $\theta_i$, instead of the phase angle $\theta_i$ itself, and inputs these to the error detection unit 40.

The error detection unit 40 of the second embodiment calculates each coefficient in Equation (5) using Equation (21), which is obtained by replacing cos $\theta$ and sine with $x_i$ and $y_i$, respectively, in Equation (7).

$$A_1 = \begin{bmatrix} \sum x_i^2 & \sum x_i y_i & \sum x_i \\ \sum x_i y_i & \sum y_i^2 & \sum y_i \\ \sum x_i & \sum y_i & N \end{bmatrix} \quad (21)$$

$$B_1 = \begin{bmatrix} \sum R_i^2 x_i \\ \sum R_i^2 y_i \\ \sum R_i^2 \end{bmatrix}$$

$$C_1 = \begin{bmatrix} A_{c1} \\ A_{s1} \\ R_{o1} \end{bmatrix}$$

$$A_1 \cdot C_1 = B_1$$

$$C_1 = A_1^{-1} \cdot B_1$$

The error detection unit 40 can obtain each coefficient in Equation (5) as an element of the $C_1$ matrix with less amount of calculation than in Equation (7) by means of Equation (21).

For Equation (8), $\cos 2\theta_i$ and $\sin 2\theta_i$ can be expressed as in Equation (22) using $x_i$ and $y_i$, respectively, by the double angle formula.

$$\cos 2\theta_i = 2\cos^2\theta_i - 1 = 2x_i^2 - 1 \quad (22)$$

$$\sin 2\theta_i = 2\sin\theta_i \cos\theta_i = 2x_i y_i$$

The error detection unit 40 of the second embodiment calculates each coefficient in Equation (6) using Equation (23), which is obtained by substituting Equation (22) into Equation (8).

$$A_1 = \begin{bmatrix} \sum(2x_i^2-1)^2 & \sum 2x_i y_i(2x_i^2-1) & \sum(2x_i^2-1) \\ \sum 2x_i y_i(2x_i^2-1) & \sum(2x_i y_i)^2 & \sum 2x_i y_i \\ \sum(2x_i^2-1) & \sum 2x_i y_i & N \end{bmatrix} \quad (23)$$

$$B_2 = \begin{bmatrix} \sum R_i^2(2x_i^2-1) \\ \sum R_i^2 2x_i y_i \\ \sum R_i^2 \end{bmatrix}$$

$$C_2 = \begin{bmatrix} A_{c2} \\ A_{s2} \\ R_{o2} \end{bmatrix}$$

$$A_2 \cdot C_2 = B_2$$

$$C_2 = A_2^{-1} \cdot B_2$$

The error detection unit 40 can obtain each coefficient in Equation (6) as an element of the $C_2$ matrix with less number of calculations than in Equation (6) by means of Equation (23).

In the same manner as the first embodiment, the error detection unit 40 calculates each correction value (i.e., the correction residual remaining in the 2-phase sinusoidal signals) from the obtained coefficients. In the first embodiment, the correction values were obtained by equations (9) to (12).

Here, among Equations (9) to (12) for obtaining correction values, Equation (11) includes a square root operation, which causes an increase in the amount of calculation. Therefore, in the present embodiment, the calculation of Equation (11) is simplified. Namely, the McLaurin expansion of the square root of 1+x (V (1+x)) is given by Equation (24).

$$\sqrt{1+x} = 1 + \frac{1}{2}x + \frac{1}{8}x^2 + \frac{1}{16}x^3 - \frac{5}{128}x^4 + \cdots \quad (24)$$

If $x=-2A_{c2}$ in Equation (24), the operations involving square roots in Equation (11) can be approximated by a polynomial as in Equation (25).

$$\Delta K_a = \sqrt{1-2A_{c2}} \quad (25)$$

$$= 1 + \frac{1}{2}(-2A_{c2}) - \frac{1}{8}(-2A_{c2})^2 + \cdots$$

$$= 1 - A_{c2} + \frac{1}{2}A_{c2}^2 + \cdots$$

When a high-precision encoder with a small error is used, it can be considered that $\Delta K_a \approx 1$, i.e., $A_{c2} \approx 0$. Therefore, for the Q14 format, expansion up to the second order is sufficient to obtain sufficient accuracy. Therefore, Equation (11) can be simplified as in Equation (26) to suppress the amount of calculation.

$$\Delta K_a = 1 - A_{c2} + \frac{1}{2}A_{c2}^2 \quad (26)$$

The correction value calculation process for calculating correction values using the correction value calculation apparatus 1 can be realized in the same procedure as the correction value calculation process in the first embodiment shown in FIG. 2, but using Equations (21), (23), and (26) instead of Equations (7), (8), and (11), respectively.

Then, the simulation conducted to confirm the effectiveness of the correction value calculation process by the correction value calculation apparatus 1 will be described.

In conducting the simulation, 32 points of 2-phase sinusoidal signals $X_i$ and $Y_i$ (that is, N=32) with errors of $C_x=0.1$, $C_y=0.05$, $A_x=0.95$, $A_y=1.05$, and $P_y=-0.04$ were randomly generated as data to which the correction value calculation process was applied. The correction value calculation process of the second embodiment was then applied to the 32-point data. The cumulative number of times M that the correction is applied (the number of repetitions of steps S02 to S04) is set to 30.

Figure 9:
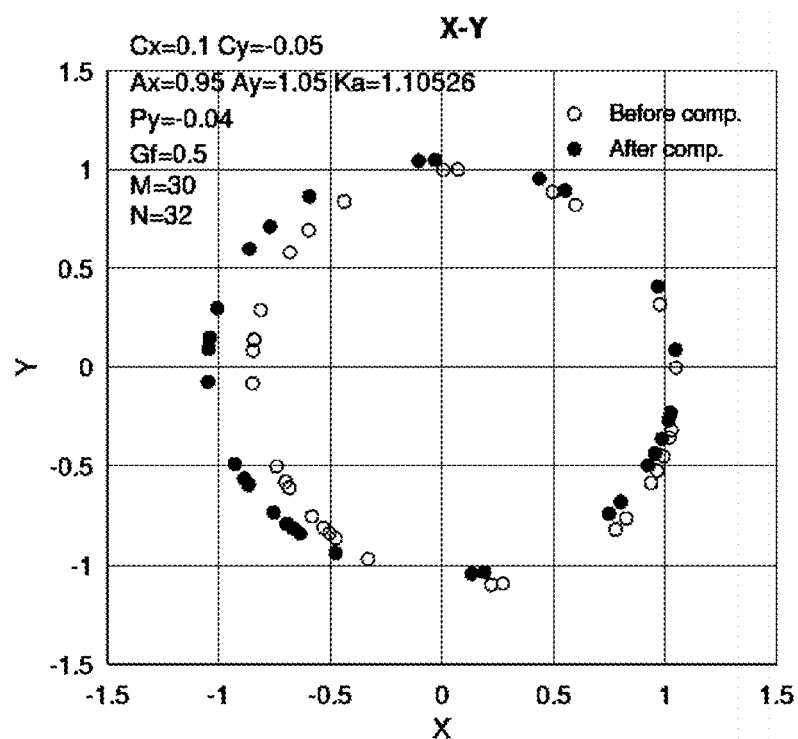
FIG. 9 is a graph plotting the 2-phase sinusoidal signals $X_i$ and $Y_i$ before and after correction as Lissajous waveforms with respect to the correction value calculation apparatus 1 of the second embodiment.
Figure 10:
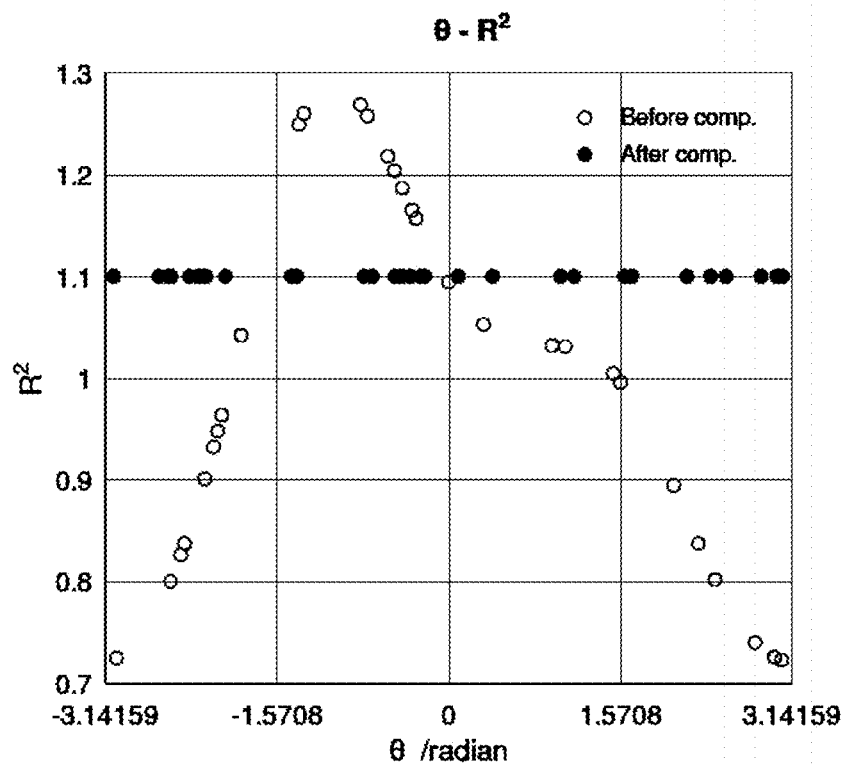
FIG. 10 is a graph plotting the phase angle $\theta_i$ and the squared radius $R_i^2$ obtained by converting the 2-phase sinusoidal signals $X_i$ and $Y_i$ before and after correction, with the horizontal axis representing $\theta$ and the vertical axis representing $R^2$, for the correction value calculation apparatus 1 in the second embodiment.
Figure 11:
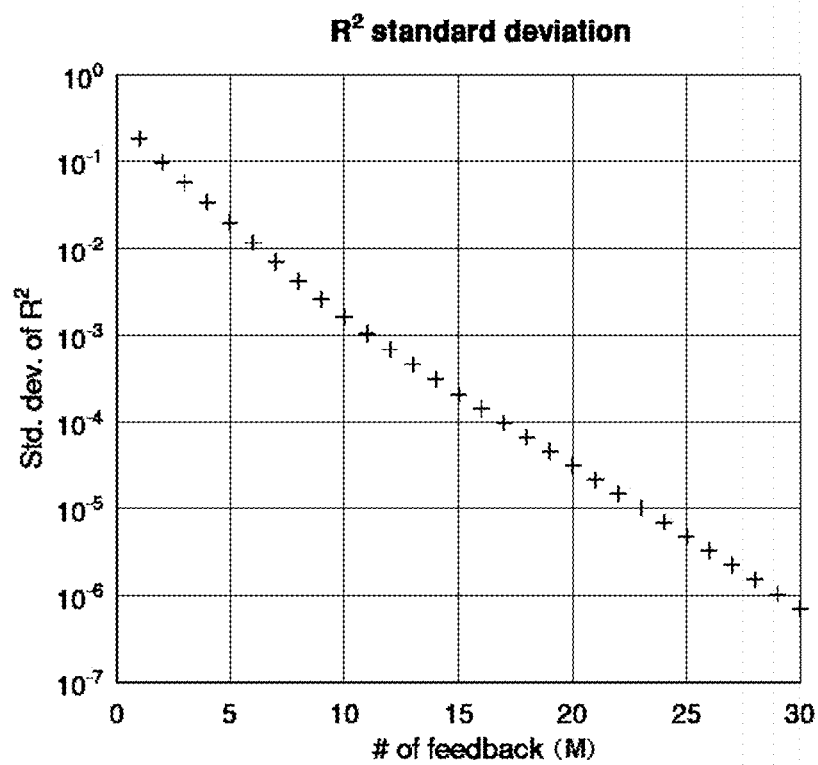
FIG. 11 is a graph plotting the standard deviation of $R^2$ for the correction value calculation apparatus 1 of the second embodiment, with the horizontal axis representing the cumulative number of times M that the correction value calculation is applied.
Figure 12:
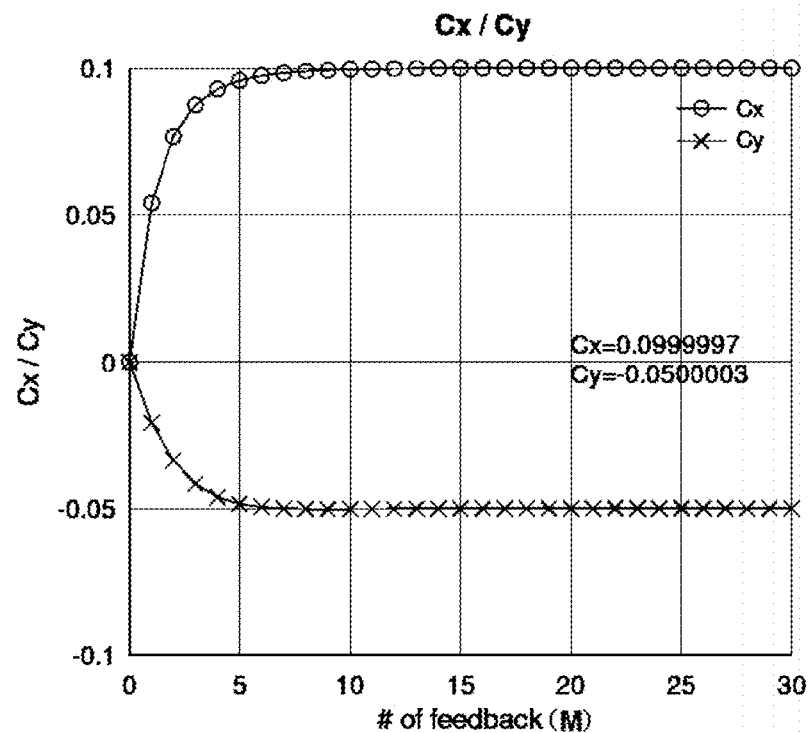
FIG. 12 is a graph plotting the offset errors $C_x$ and $C_y$ for the correction value calculation apparatus 1 of the second embodiment, with the horizontal axis representing the cumulative number of times M that the correction value calculation is applied.
Figure 13:
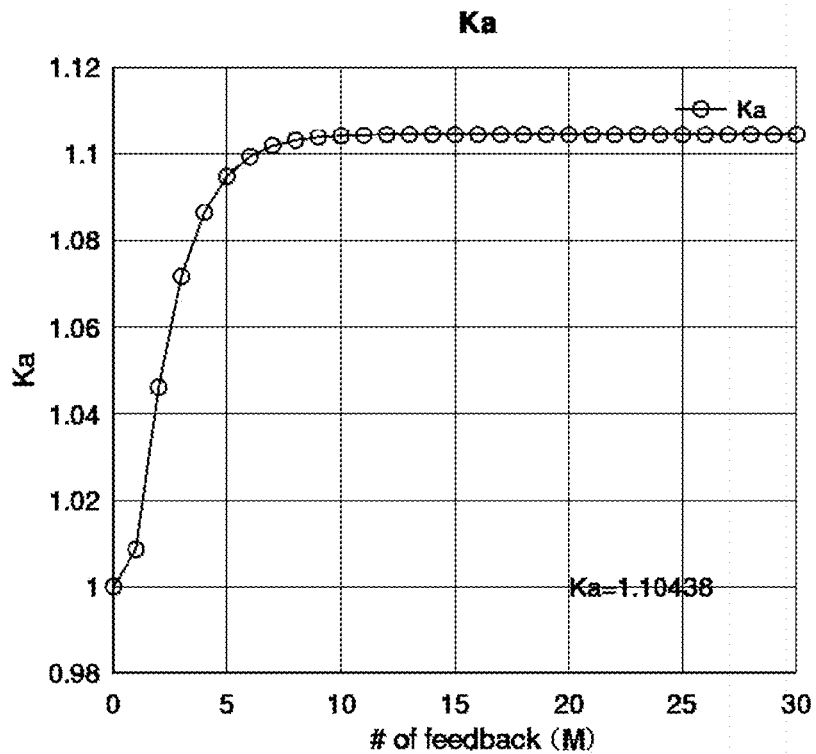
FIG. 13 is a graph plotting the amplitude ratio error $K_a$ for the correction value calculation apparatus 1 of the second embodiment, with the horizontal axis representing the cumulative number of times M that the correction value calculation is applied.
Figure 14:
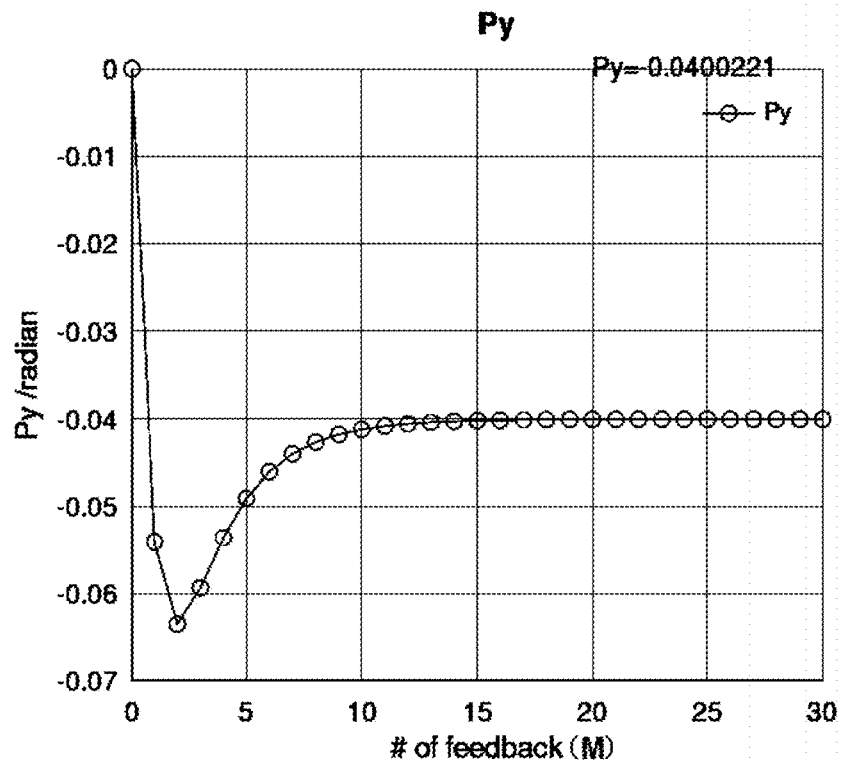
FIG. 14 is a graph plotting the phase difference error $P_y$ for the correction value correction value calculation apparatus 1 of the second embodiment, with the horizontal axis representing the cumulative number of times M that the correction value calculation is applied.

FIG. 9 is a graph plotting the 2-phase sinusoidal signals $X_i$ and $Y_i$ before and after correction as Lissajous waveforms. FIG. 10 is a graph plotting the phase angle $\theta_i$ and the squared radius $R_i^2$ obtained by converting the 2-phase sinusoidal signals $X_i$ and $Y_i$ before and after correction, with the horizontal axis representing $\theta$ and the vertical axis representing $R^2$. From these graphs, it can be seen that $R^2$ is constant due to the correction and that close to ideal 2-phase sinusoidal signals $X_i$ and $Y_i$ are obtained.

FIGS. 11-14 are graphs plotting the standard deviation of $R^2$ and the errors of $C_x$, $C_y$, $K_a$, and $P_y$ to confirm the effect of the cumulative application of corrections, with the horizontal axis representing the cumulative number of times M that the correction value calculation is applied. The standard deviation of $R^2$ shown in FIG. 11 becomes smaller as the cumulative number of times M that the correction value calculation is applied increases, confirming that the variation of $R^2$ disappears with the cumulative application of the correction value calculation. For each of the errors shown in FIGS. 12-14, it can be seen how they converge to the error values set when generating the data for the 2-phase sinusoidal signals $X_i$ and $Y_i$. It can be seen that the number of times of cumulative application M=10 is sufficient for convergence.

According to the correction value calculation apparatus 1 and the correction value calculation process of the second embodiment described above, the calculations for the sin function, cos function, and square root are not necessary, the correction values can be obtained with high accuracy and efficiency by simple calculation using only four arithmetic operations, and correction can be performed. Therefore, the system can increase calculation speed while reducing computing resources, enabling applications such as dynamically updating correction values by executing correction value calculation processing in a small and lightweight digital signal processing device, such as those embedded in an encoder.

Third Embodiment

In the following, the eighth embodiment of the present invention will be described on the basis of FIGS. 15 to 23.

The correction value calculation method of the first embodiment described above is effective when the encoder detection unit 11 has a measurement range within one period of 2-phase sinusoidal signals or when the fluctuation in the intensity of the signal output by the encoder detection unit 11 is small. However, if the fluctuation of signal intensity is large in the measurement range of displacement exceeding one period of 2-phase sinusoidal signals, the correction value calculation method of the first embodiment may not provide sufficiently accurate correction values.

Figure 15:
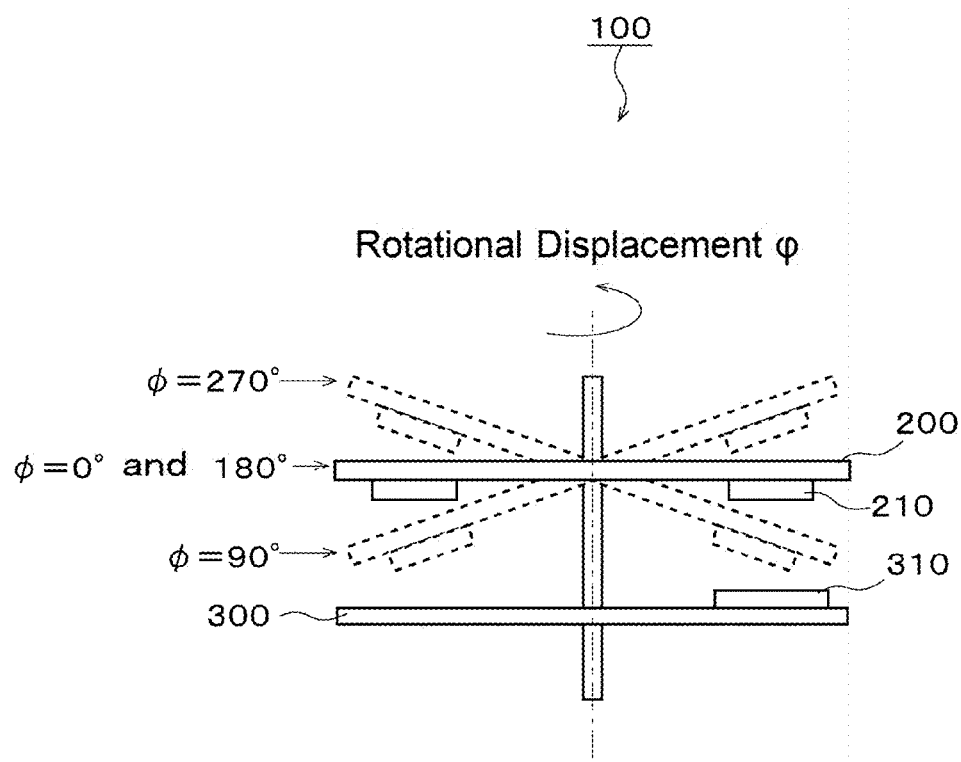
FIG. 15 schematically shows a rotor tilted relative to a stator in a rotary encoder.
Figure 16:
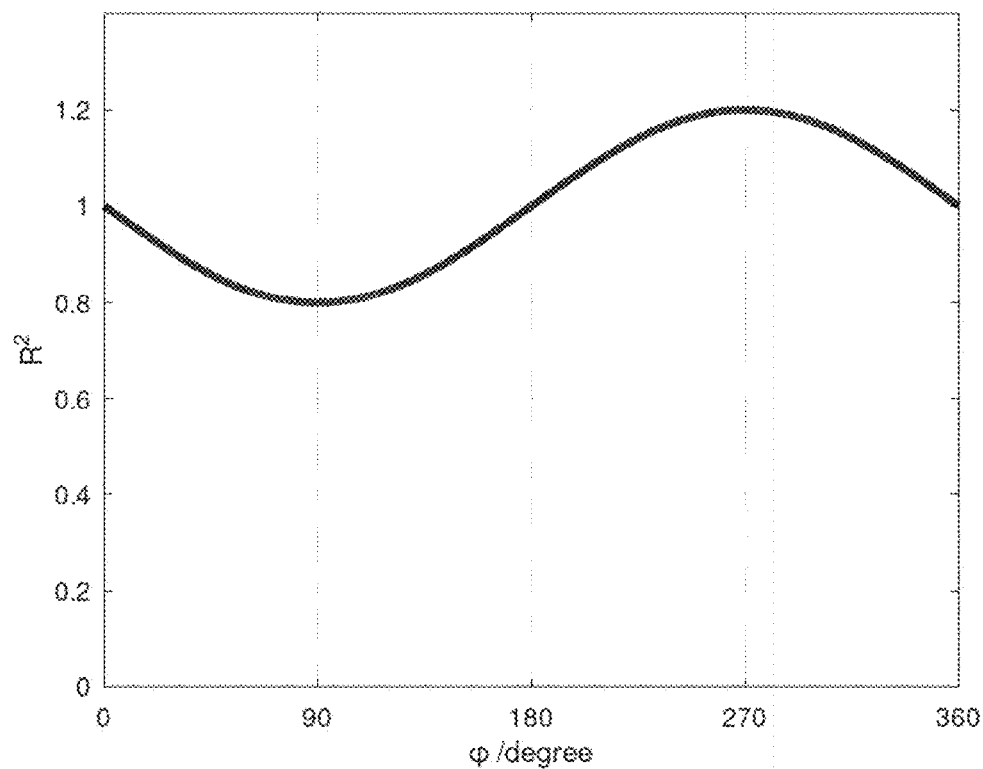
FIG. 16 shows the change in signal intensity of the 2-phase sinusoidal signals with respect to the rotational displacement $\varphi$ when the rotor is tilted.

For example, assume an electromagnetic induction type rotary encoder detector 110 that has a number of rotor scales 210 on a rotor 200 and outputs 2-phase sinusoidal signals by reading the opposing rotor scales 210 by a stator detector 310 of a stator 300. In such a rotary encoder detection unit 110, the 2-phase sinusoidal signals with a period corresponding to the number of rotor scale 210 are output during one rotation of the rotor 200. For example, if the rotor 200 has 100 rotor scales 210, 100 cycles of 2-phase sinusoidal signals are output during one rotation of the rotational displacement φ from 0 degrees to 360 degrees. In this case, the Lissajous waveform will make 100 rotations. When the rotor 200 is tilted with respect to the stator 300 as shown in FIG. 15, the distance between the stator detector 310 and the rotor scale 210 changes with the rotational displacement φ of the rotor 200. Accordingly, the signal intensity of the 2-phase sinusoidal signals also fluctuates with rotational displacement φ, and the squared radius $R^2$ also fluctuates with a period longer than the signal pitch, as shown in FIG. 16. That is, the signal intensity (and the squared radius $R^2$) increases at rotational displacement φ where the distance between the stator detector 310 and the rotor scale 210 becomes shorter, and the signal intensity (and the squared radius $R^2$) decreases at rotational displacement φ where the distance between the stator detector 310 and the rotor scale 210 becomes longer. Similar fluctuations in signal intensity can occur in various encoders other than the electromagnetic induction type rotary encoder as a result of misalignment due to inadequate adjustment during installation of the guiding mechanism on which the encoder is mounted, for example.

In the squared radius $R^2$ obtained from the signals output by the actual encoder detection unit 11, fluctuations caused by interpolation errors in the 2-phase sinusoidal signals and those caused by fluctuations in signal intensity are mixed together, making it difficult to separate them. As a result, it is difficult to obtain correction values for 2-phase sinusoidal signals with high accuracy.

In the correction value calculation apparatus 1 according to the third embodiment, the effect of wide-range fluctuations in the squared radius $R^2$ is reduced by focusing on the fact that the fluctuations caused by signal intensity fluctuations have a long period exceeding the period of the 2-phase sinusoidal signals, while the fluctuations caused by interpolation errors have a short period less than the period of the 2-phase sinusoidal signals.

Figure 17:
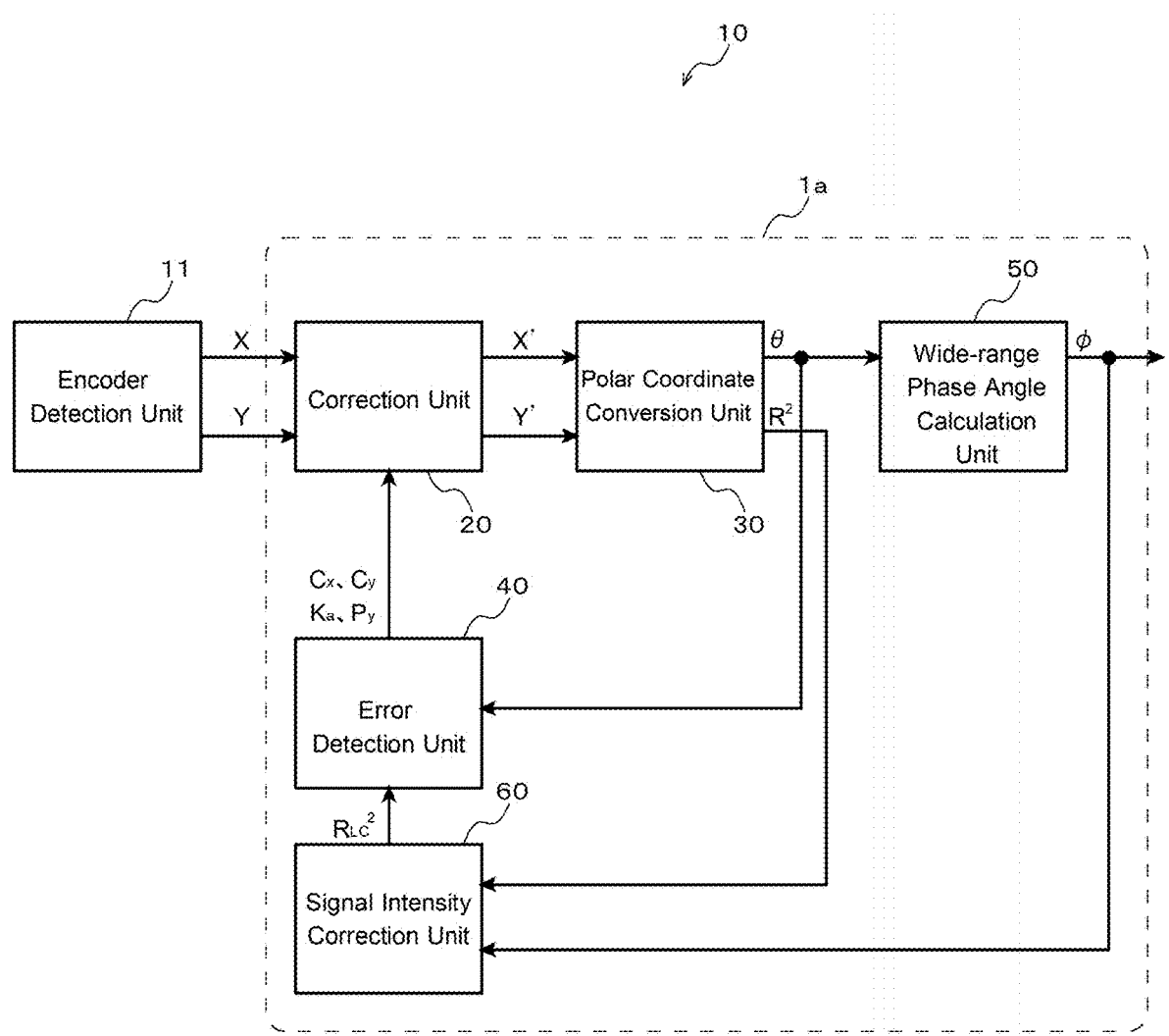
FIG. 17 is a block diagram showing the basic configuration of the correction value calculation apparatus 1a of the third embodiment, together with an encoder detection unit 11 in the encoder 10.

FIG. 17 is a block diagram showing the basic configuration of the correction value calculation apparatus 1a of the third embodiment, together with an encoder detection unit 11. In the example shown in FIG. 17, the correction value calculation apparatus 1a is implemented in the form of being built into the encoder 10 together with the encoder detection unit 11, but it is the same as in the first embodiment that the correction value calculation apparatus 1a may be implemented as a separate unit from encoder 10. In the present embodiment, the correction value calculation apparatus 1a can correct fluctuations in signal intensity over a wide range of displacements that exceed the displacement corresponding to one period of 2-phase sinusoidal signals and can obtain highly accurate correction values. To achieve this, the correction value calculation apparatus 1a of the third embodiment is characterized in that it is equipped with a signal intensity correction unit 60 in addition to the configuration of the correction value calculation apparatus 1 in the first embodiment. In the following, the configuration that differs from the correction value calculation apparatus 1 in the first embodiment will be explained in detail, and the configuration common to the correction value calculation apparatus 1 in the first embodiment will be omitted here with the same reference sign.

As in the first embodiment, the 2-phase sinusoidal signals X and Y are input to the correction unit 20. The correction unit 20 holds the correction values to be applied to the 2-phase sinusoidal signals. The correction unit 20 corrects the 2-phase sinusoidal signals X and Y using the correction values and outputs output signals X' and Y'. The output signals X' and Y' of the correction unit 20 are input to the polar coordinate conversion unit 30. The polar coordinate conversion unit 30 calculates the phase angle $\theta_i$ and the squared radius $R_i^2$, which is the square of the Lissajous radius $R_i$ corresponding to the phase angle $\theta_i$, from the output signals $X_i'$ and $Y_i'$ of the correction unit 20 by the calculations in Equations (3) and (4) described in the first embodiment.

The phase angle $\theta_i$ calculated by the polar coordinate conversion unit 30 is input to the error detection unit 40 and the wide-range phase angle calculation unit 50, as in the correction value calculation apparatus 1 of the first embodiment. The squared radius $R_i^2$ calculated by the polar coordinate conversion unit 30 is input to the signal intensity correction unit 60.

The wide-range phase angle calculation unit 50 calculates for each phase angle $\theta_i$ a wide-range phase angle $\varphi_i$ that represents a wide-range displacement exceeding a displacement corresponding to one cycle of the 2-phase sinusoidal signals, in the same manner as in the first embodiment. The wide-range phase angle $\varphi_i$ can be obtained from the number of cycles of 2-phase sinusoidal signals (number of Lissajous signal rotations) $n_i$ from the reference displacement (origin) and the phase angle $\theta_i$ calculated by the polar coordinate conversion unit 30. For example, in the case of an encoder that has 100 cycles of 2-phase sinusoidal signals in one cycle (0 to 360 degrees) of the wide-range phase angle φ, Di can be mutually transformed with $n_i$ and $θ_i$ by the relation $φ_i=(n_i×360+θ_i)/100$. The number of rotations $n_i$ of the Lissajous signal can be counted by a known incremental up-down counter (upper counter). In the first embodiment, the wide-range phase angle calculation unit 50 was not included in the correction value calculation apparatus 1 and existed as a configuration of encoder 10, but in the third embodiment, the wide-range phase angle calculation unit 50 is a component of the correction value calculation apparatus 1a.

As described in detail below, the signal intensity correction unit 60 uses the squared radius $R_i^2$ input from the polar coordinate conversion unit 30 and the wide-range phase angle $φ_i$ input from the wide-range phase angle calculation unit 50 to obtain the coefficients in the approximate expression model expressing the squared radius $R^2$ as a trigonometric function of the wide-range phase angle φ by the least-squares method, from the obtained coefficients, signal intensity correction value $R_{ci}^2$ corresponding to each wide-range phase angle $φ_i$. The square radius $R_i^2$ corresponding to each wide-range phase angle $φ_i$ is then corrected based on the signal intensity correction value $R_{ci}^2$.

The long-period fluctuation of the squared radius $R^2$ can be approximated by the sum of the harmonics, with the fundamental frequency being one rotation of the wide-range phase angle φ. The signal intensity corrector 60 may, therefore, use Equation (27) as an approximate expression model that expresses the square radius $R^2$ as a trigonometric function of the wide-range phase angle φ.

$$R^2 = a_k \cos k\phi + b_k \sin k\phi + c_k \quad (27)$$

In equation (27), k is an integer from 1 to $N_L$, and $N_L$ is the order of the highest harmonic used in the approximation. Increasing $N_L$ can improve the accuracy of the approximation, but increases the computational amount required to obtain the coefficients $a_k$ and $b_k$, as well as the signal intensity correction value $R_{Ci}^2$. Therefore, $N_L$ is determined by considering the tradeoff between accuracy and computational amount. For example, $N_L$ may be set to 3, and the approximate expression model may include up to the third harmonic.

The signal intensity correction unit 60 can obtain the coefficients $a_k$ and $b_k$ in Equation (27), for each k from 1 to $N_L$, as elements of the Rx matrix by Equation (28).

$$P_k = \begin{bmatrix} \sum \cos^2 k\phi_i & \sum \sin k\phi_i \cos k\phi_i & \sum \cos k\phi_i \\ \sum \cos k\phi_i \sin k\phi_i & \sum \sin^2 k\phi_i & \sum \sin k\phi_i \\ \sum \cos k\phi_i & \sum \sin k\phi_i & N \end{bmatrix} \quad (28)$$

$$Q_k = \begin{bmatrix} \sum R_i^2 \cos k\phi_i \\ \sum R_i^2 \sin k\phi_i \\ \sum R_i^2 \end{bmatrix}$$

$$R_k = \begin{bmatrix} a_k \\ b_k \\ c_k \end{bmatrix}$$

$$P_k \cdot R_k = Q_k$$

$$R_k = P_k^{-1} \cdot Q_k$$

where $$k = 1, 2, 3, \ldots, N_L.$$

The signal intensity correction unit 60 calculates the signal intensity correction value $R_{Ci}^2$ corresponding to each of the wide-range phase angles $φ_i$ from the obtained coefficients $a_k$ and $b_k$ using Equation (29).

$$Rc_i^2 = \sum_{k=1}^{N_L} (a_k \cos k\phi_i + b_k \sin k\phi_i) \quad (29)$$

Furthermore, the signal intensity correction unit 60 corrects the squared radius $R_i^2$ with the signal intensity correction value $R_{Ci}^2$ according to equation (30) to calculate the corrected squared radius $R_{LCi}^2$ corresponding to each of the wide-range phase angles $φ_i$, which is input to the error detection unit 40.

$$R_{LCi}^2 = R_i^2 - Rc_i^2 \quad (30)$$

The error detection unit 40 uses the phase angle $θ_i$ calculated by the polar coordinate conversion unit 30 and the squared radius $R_{LCi}^2$ corrected by the signal intensity correction unit 60 to calculate correction values using the same method as the signal intensity correction unit 60 in the first embodiment.

Figure 18:
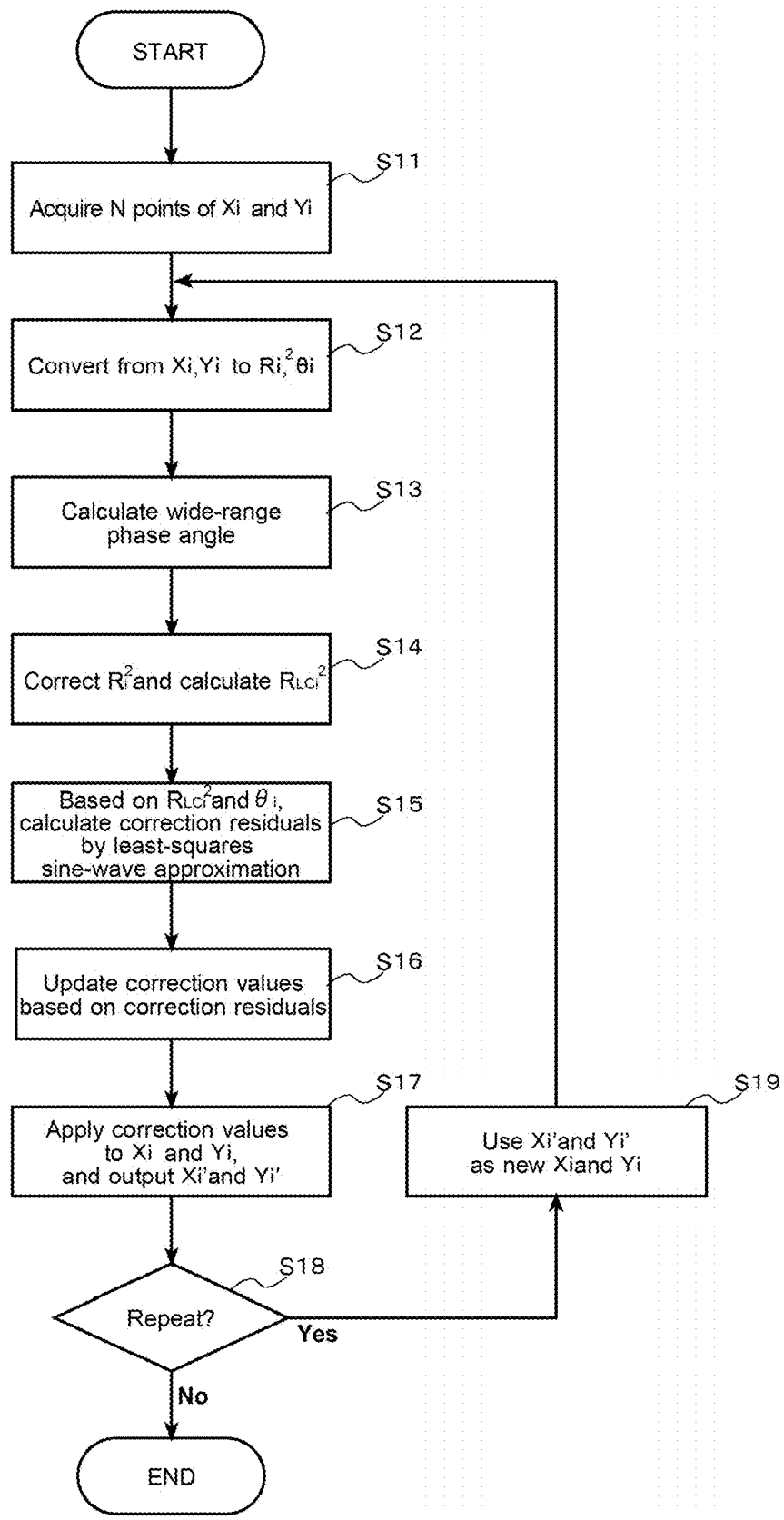
FIG. 18 is a flowchart showing the procedure of the correction value calculation process in the second embodiment.

FIG. 18 is a flowchart showing a procedure of the correction value calculation process performed by the correction value calculation apparatus 1a in the third embodiment configured as described above.

When the correction value calculation process is started, the correction unit 20 first acquires N pairs of digital data of 2-phase sinusoidal signals X and Y ($X_i$, $Y_i$; where i is 0 to N−1) as output data of the encoder detection unit 11 for correction (step S11). The correction unit 20 may acquire this data in real-time from the encoder detection unit 11, or the encoder detection unit 11 may acquire and record the data in advance, which is then acquired by the correction unit 20 via communication means or a storage medium.

Then, the polar coordinate conversion unit 30 calculates the phase angle $θ_i$ and the corresponding squared radius $R_i^2$ for each of the N data pairs of the 2-phase sinusoidal signals (step S12). Then, the wide-range phase angle calculation unit 50 calculates the wide-range phase angle φ, which represents the wide-range displacement angle exceeding one cycle of the 2-phase sinusoidal signals (step S13). The signal intensity correction unit 60 calculates the signal intensity correction value $R_{Ci}^2$ corresponding to each wide-range phase angle $φ_i$ to correct for wide-range signal intensity fluctuations and thereby corrects the corresponding squared radius $R_i^2$ to calculate $R_{LCi}^2$ (step S14).

Then, based on each phase angle $θ_i$ calculated in step S12 and squared radius $R_i^2$ corrected in step S14, the error detection unit 40 calculates the correction residuals of the offset errors ($ΔC_x$ and $ΔC_y$) in the orthogonal direction of the 2-phase sinusoidal signals, the correction residual of the amplitude ratio error ($ΔK_a$) and correction residual of phase difference error ($ΔP_y$), which are remaining in the 2-phase sinusoidal signals X and Y input in the step S01, are calculated (step S15). Then, the correction values held by the correction unit 20 are updated based on the calculated correction residuals for the respective errors (step S16). The error detection unit 40 may update correction values using Equation (19) in the same manner as the first embodiment.

The correction unit 20 then corrects the 2-phase sinusoidal signals based on the correction values calculated by the error detection unit 40 and outputs the signals $X_i'$ and $Y_i'$ (step S17).

If the calculation of correction values is repeated (step S18; Yes), the 2-phase sinusoidal signals $X_i'$ and $Y_i'$ corrected in step S05 are used as new 2-phase sinusoidal signals $X_i$ and $Y_i$ (step S19), and processing returns to step S12. Steps S12 through S17 are repeated as many times as necessary, and when repetition is no longer necessary (step S18; No), the correction value calculation process ends. The correction values at the end of the correction value calculation process are the final correction values. The number of times the correction values are repeatedly calculated and updated may be a predetermined number. Alternatively, the process may be repeated until the correction residuals are sufficiently small (e.g., until they fall below a predetermined threshold). According to such a correction value calculation process, it is possible to obtain highly accurate correction values after removing the effects of wide-ranging fluctuations in the squared radius $R^2$. In the same manner as in the first embodiment, operations to calculate and update correction values based on the 2-phase sinusoidal signals X and Y are applied cumulatively, and the correction residuals converge to values with small errors (0 for $\Delta C_x$, $\Delta C_y$, and $\Delta P_y$ and 1 for $\Delta K_a$).

Next, an example of applying the correction value calculation process by the correction value calculation unit 1a of the present embodiment to 2-phase sinusoidal signals X and Y output by an actual electromagnetic induction type rotary encoder will be described. This encoder is configured to output 100 cycles of 2-phase sinusoidal signals while the rotor displacement $\varphi$ changes for one cycle (i.e., from 0 to 360 degrees).

Figure 19:
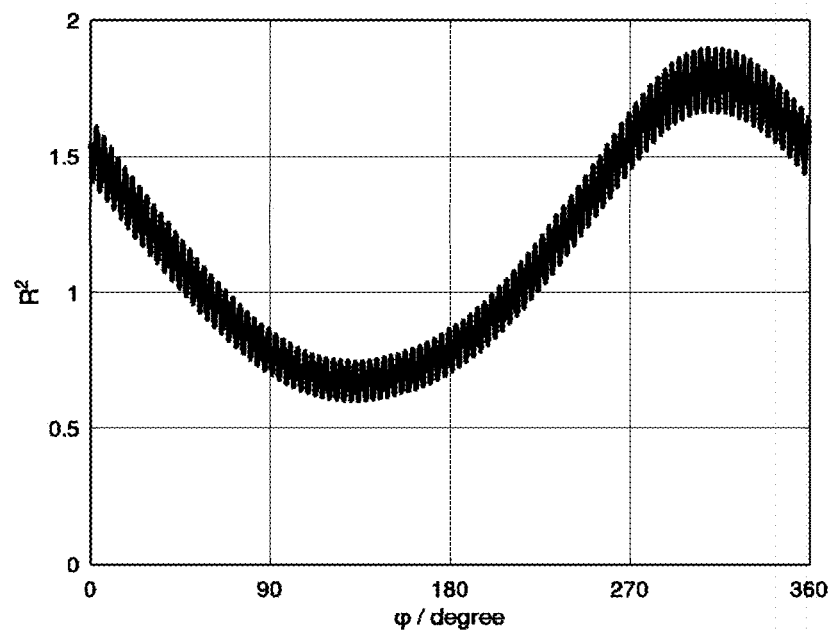
FIG. 19 is a graph plotting the squared radius $R_i^2$ before correction of the signal intensity, with the horizontal axis representing the rotor displacement $\varphi$, for the correction value calculation apparatus 1a in the third embodiment.

FIG. 19 is a graph plotting the squared radius $R_i^2$ calculated from the 2-phase sinusoidal signals before correction of the signal intensity, with the horizontal axis representing the rotor displacement $\varphi$ (i.e., the wide-range phase angle). While $\varphi$ varies from 0 to 360 degrees, the uncorrected squared radius $R^2$ fluctuates largely with a long period, and the short-period fluctuations of the 2-phase sinusoidal signals are superimposed on the large fluctuations.

Figure 20:
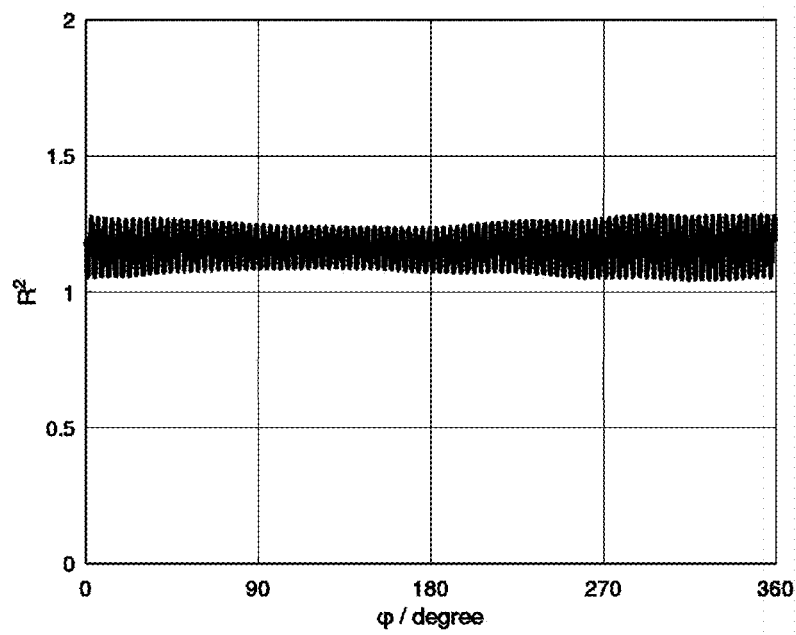
FIG. 20 is a graph plotting the squared radius $R_{LCi}^2$ after applying the correction of the signal intensity, with the horizontal axis representing the rotor displacement $\varphi$, for the correction value calculation apparatus 1a in the third embodiment.

FIG. 20 is a graph plotting the squared radius $R_{LCi}^2$ after applying the correction of the signal intensity by the signal intensity correction unit 60 on the squared radius $R_i^2$ before correction in FIG. 19, with the horizontal axis representing the rotor displacement $\varphi$. It can be seen that the correction suppresses long-period fluctuations.

Figure 21:
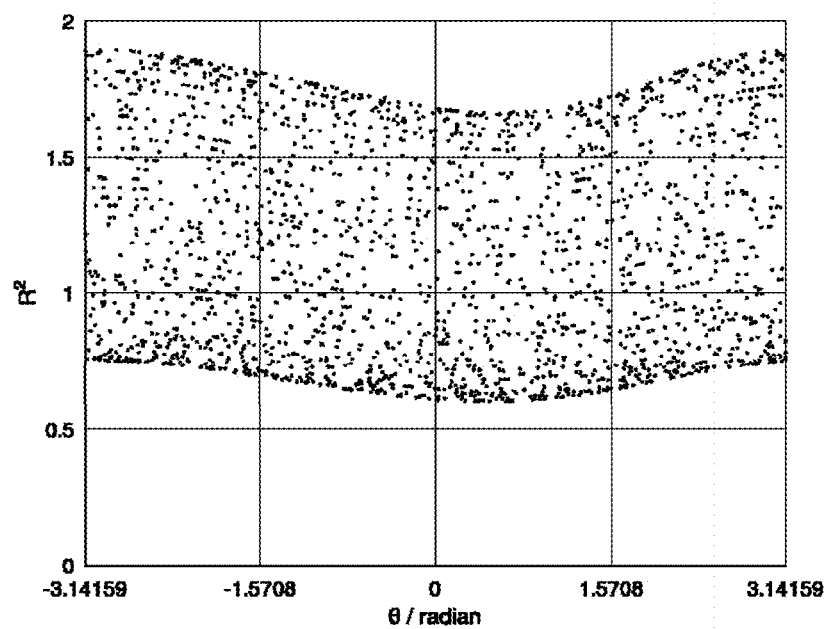
FIG. 21 is a graph plotting the squared radius $R_i^2$ before the correction of the signal intensity, with the horizontal axis representing the phase angle $\theta$, for the correction value calculation apparatus 1a in the third embodiment.

FIG. 21 is a graph plotting the squared radius $R_i^2$ before the correction of the signal intensity, with the horizontal axis representing the phase angle $\theta$. The signal intensity fluctuates significantly within one rotation of the rotor, and this cannot be separated from the fluctuation in the squared radius $R^2$ due to interpolation error, and the error detection unit 40 cannot calculate the correction values with high accuracy in this circumstance.

Figure 22:
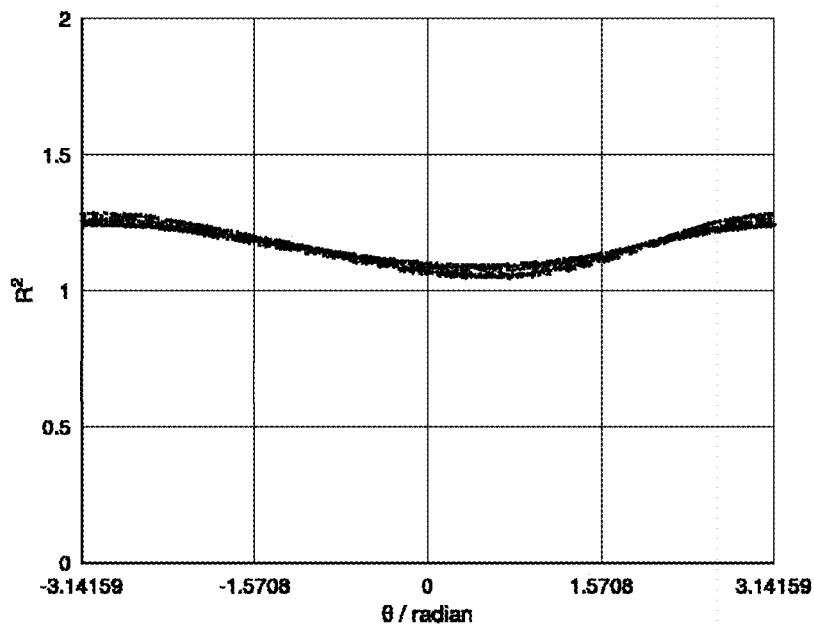
FIG. 22 is a graph plotting the squared radius $R_{LCi}^2$ after correcting the signal intensity, with the horizontal axis representing the phase angle $\theta$, for the correction value calculation apparatus 1a in the third embodiment.

FIG. 22 is a graph plotting the squared radius $R_{LCi}^2$ after correcting the signal intensity, with the horizontal axis representing the phase angle $\theta$. It can be seen that the signal intensity fluctuations over a wide range were suppressed and that fluctuations in $R^2$ due to interpolation errors could be separated. Using the $R_{LCi}^2$, the error detection unit 40 can calculate the correction values with high accuracy.

Figure 23:
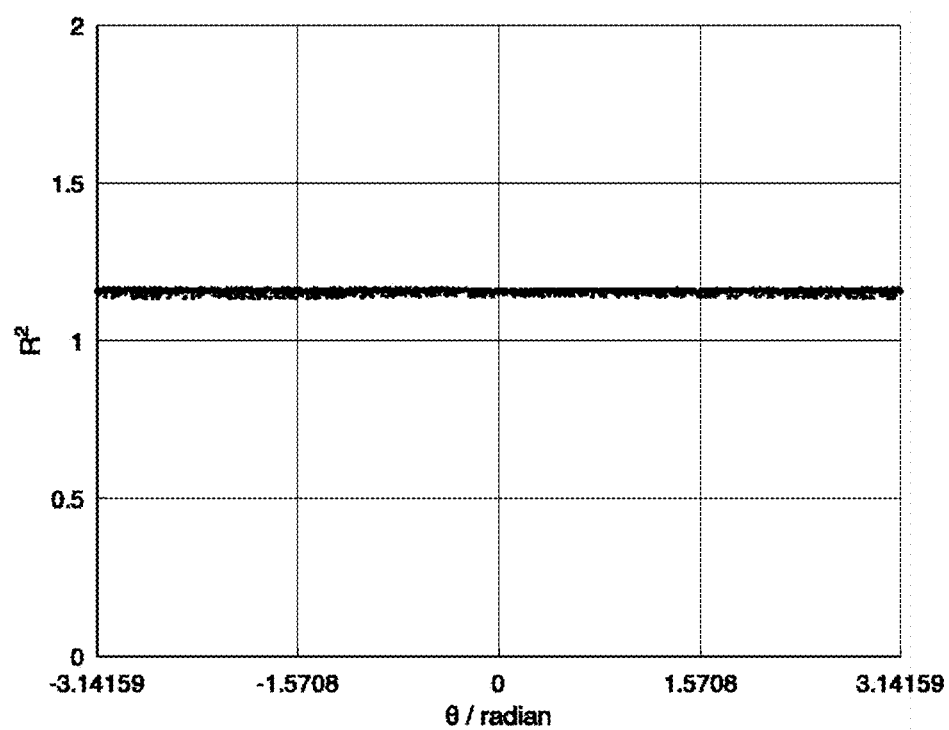
FIG. 23 is a graph plotting the squared radius $R_i^2$ as corrected after applying the correction values calculated using the squared radius $R_{LCi}^2$ after correcting the signal intensity to the 2-phase sinusoidal signals $X_i$ and $Y_i$, with the horizontal axis representing the phase angle θ, for the correction value calculation apparatus 1a in the third embodiment.

FIG. 23 is a graph plotting the squared radius $R_i^2$ as corrected after applying the correction values calculated by the error detection unit 40 using the squared radius $R_{LCi}^2$ after correcting the signal intensity to the 2-phase sinusoidal signals Xi and Yi, with the horizontal axis representing the phase angle $\theta$. The squared radius $R_i^2$ is independent of the phase angle $\theta_i$, and the result is almost constant, indicating that the correction of the 2-phase sinusoidal signals to reduce interpolation errors was achieved with high accuracy.

According to the correction value calculation apparatus 1a and the correction value calculation process of the third embodiment described above, when the signal intensity of the encoder output signal fluctuates over a wide range exceeding one cycle of 2-phase sinusoidal signals, the correction values can be calculated while suppressing the effects of fluctuations in signal intensity.

According to Equation (28), a simple matrix operation can be used to obtain the coefficients needed to calculate the correction values.

Variation of Embodiments

Although the embodiments are described above, the present invention is not limited to the examples. For example, in the third embodiment described above, the case in which the correction value calculation apparatus 1a is applied to a rotary encoder is described as an example, but the encoder may be a linear encoder. In the linear encoder, when there are factors that cause periodic fluctuations in the guide mechanism, the correction value calculation process in the third embodiment can be applied to reduce the periodic fluctuations and then calculate the correction values.

In each of the above embodiments, the case in which $\varphi$ is obtained in the wide-range phase angle calculation unit 50 from the number of revolutions $n_i$ of the Lissajous signal and the phase angle $\theta$ is described as an example, but $\varphi$ may be obtained by other methods. For example, in an absolute encoder, $\varphi$ may be obtained by absolute detection.

Any additions, deletions, and design modifications of constituent elements in the embodiments, which those skilled in the art could conceive of, and any combinations of features of the embodiments can also fall within the scope of the present invention as long as they contain the spirit of the present invention.

What is claimed is:

1. A correction value calculation method for calculating correction values to correct the 2-phase sinusoidal signals (X, Y) output by the encoder, comprising:
a polar coordinate calculation step for calculating, for N phase angles $\theta_i$ and the Lissajous radius $R_i$ corresponding to each phase angle $\theta_i$ in the Lissajous waveform drawn by the 2-phase sinusoidal signals, a squared radius $R_i^2$, which is the square of the Lissajous radius $R_i$ corresponding to each phase angle $\theta_i$; and
a correction value calculation step for calculating, based on each phase angle $\theta_i$ and the squared radius $R_i^2$ corresponding to the phase angle $\theta_i$ calculated in the polar coordinate calculation step, at least a correction residual $\Delta C_x$ of an offset error $C_x$ of the signal X, a correction residual $\Delta C_y$ of an offset error $C_y$ of the signal Y, a correction residual $\Delta K_a$ of an amplitude ratio error $K_a$ of the signals X and Y, and a correction residual $\Delta P_y$ of a phase difference error $P_y$ between the signal X and the signal Y, and then calculating the correction values based on correction residuals, wherein the signals X and Y constitute the 2-phase sinusoidal signals, and in the correction value calculation step, and coefficients in an approximate expression model in which the squared radius $R^2$ is expressed by a trigonometric function including the phase angle $\theta$ as an argument are obtained by the least-squares method using each phase angle $\theta_i$ and the squared radius $R_i^2$ corresponding to each phase angle $\theta_i$ and the correction residual is obtained from the obtained coefficients.

2. The correction value calculation method according to claim 1, wherein, in the correction value calculation step, Equations (5) and (6) are used as the approximate expression model, $$R^2 = A_{c1}\cos\theta + A_{s1}\sin\theta + R_{o1} \quad (5)$$

$$R^2 = A_{c2}\cos 2\theta + A_{s2}\sin 2\theta + R_{o2} \quad (6)$$

the coefficients $A_{c1}$ and $A_{s1}$ in Equation (5) are obtained as elements of the $C_1$ matrix using Equation (7), $$A_1 = \begin{bmatrix} \sum \cos^2\theta_i & \sum \sin\theta_i\cos\theta_i & \sum \cos\theta_i \\ \sum \cos\theta_i\sin\theta_i & \sum \sin^2\theta_i & \sum \sin\theta_i \\ \sum \cos\theta_i & \sum \sin\theta_i & N \end{bmatrix} \quad (7)$$

$$B_1 = \begin{bmatrix} \sum R_i^2\cos\theta_i \\ \sum R_i^2\sin\theta_i \\ \sum R_i^2 \end{bmatrix}$$

$$C_1 = \begin{bmatrix} A_{c1} \\ A_{s1} \\ R_{o1} \end{bmatrix}$$

$$A_1 \cdot C_1 = B_1$$

$$C_1 = A_1^{-1} \cdot B_1$$

the coefficients $A_{c2}$ and $A_{s2}$ in Equation (6) are obtained as elements of the $C_2$ matrix using Equation (8), $$A_2 = \begin{bmatrix} \sum \cos^2 2\theta_i & \sum \sin 2\theta_i\cos 2\theta_i & \sum \cos 2\theta_i \\ \sum \cos 2\theta_i\sin 2\theta_i & \sum \sin^2 2\theta_i & \sum \sin 2\theta_i \\ \sum \cos 2\theta_i & \sum \sin 2\theta_i & N \end{bmatrix} \quad (8)$$

$$B_2 = \begin{bmatrix} \sum R_i^2\cos 2\theta_i \\ \sum R_i^2\sin 2\theta_i \\ \sum R_i^2 \end{bmatrix}$$

$$C_2 = \begin{bmatrix} A_{c2} \\ A_{s2} \\ R_{o2} \end{bmatrix}$$

$$A_2 \cdot C_2 = B_2$$

$$C_2 = A_2^{-1} \cdot B_2$$

and the correction values are calculated from the obtained coefficients $A_{c1}$, $A_{s1}$, $A_{c2}$ and $A_{s2}$ using Equations (9) to (12).

$$\Delta C_x = A_{c1}/2 \quad (9)$$

$$\Delta C_y = A_{s1}/2 \quad (10)$$

$$\Delta K_a = \sqrt{1 - 2A_{c2}} \quad (11)$$

$$\Delta P_y = A_{s2}. \quad (12)$$

3. The correction value calculation method according to claim 1, wherein, in the polar coordinate calculation step, $x_i$ and $y_i$ obtained by approximating $\sin\theta_i$ and $\cos\theta_i$ using Equation (20) with A as the amplitude of the 2-phase sinusoidal signals are calculated as data representing the phase angle $\theta_i$, $$X_i/A = \cos\theta_i \equiv x_i \quad (20)$$
$$Y_i/A = \sin\theta_i \equiv y_i$$

in the correction value calculation step, Equations (5) and (6) are used as the approximate expression model, $$R^2 = A_{c1}\cos\theta + A_{s1}\sin\theta + R_{o1} \quad (5)$$

$$R^2 = A_{c2}\cos 2\theta + A_{s2}\sin 2\theta + R_{o2} \quad (6)$$

the coefficients $A_{c1}$ and $A_{s1}$ in Equation (5) are obtained as elements of the $C_1$ matrix using Equation (21), $$A_1 = \begin{bmatrix} \sum x_i^2 & \sum x_i y_i & \sum x_i \\ \sum x_i y_i & \sum y_i^2 & \sum y_i \\ \sum x_i & \sum y_i & N \end{bmatrix} \quad (21)$$

$$B_1 = \begin{bmatrix} \sum R_i^2 x_i \\ \sum R_i^2 y_i \\ \sum R_i^2 \end{bmatrix}$$

$$C_1 = \begin{bmatrix} A_{c1} \\ A_{s1} \\ R_{o1} \end{bmatrix}$$

$$A_1 \cdot C_1 = B_1$$

$$C_1 = A_1^{-1} \cdot B_1$$

the coefficients $A_{c2}$ and $A_{s2}$ in Equation (6) are obtained as elements of the $C_2$ matrix using Equation (23), $$A_2 = \begin{bmatrix} \sum (2x_i^2 - 1)^2 & \sum 2x_i y_i(2x_i^2 - 1) & \sum (2x_i^2 - 1) \\ \sum 2x_i y_i(2x_i^2 - 1) & \sum (2x_i y_i)^2 & \sum 2x_i y_i \\ \sum (2x_i^2 - 1) & \sum 2x_i y_i & N \end{bmatrix} \quad (23)$$

$$B_2 = \begin{bmatrix} \sum R_i^2(2x_i^2 - 1) \\ \sum R_i^2 2x_i y_i \\ \sum R_i^2 \end{bmatrix}$$

$$C_2 = \begin{bmatrix} A_{c2} \\ A_{s2} \\ R_{o2} \end{bmatrix}$$

-continued $$A_2 \cdot C_2 = B_2$$

$$C_2 = A_2^{-1} \cdot B_2$$

and the correction residuals are calculated from the obtained coefficients $A_{c1}, A_{s1}, A_{c2},$ and $A_{s2}$ using Equations (9), (10), (26), and (12).

$$\Delta C_x = A_{c1}/2 \qquad (9)$$

$$\Delta C_y = A_{s1}/2 \qquad (10)$$

$$\Delta K_a = 1 - A_{c2} + \frac{1}{2} A_{c2}^2 \qquad (26)$$

$$\Delta P_y = A_{s2}. \qquad (12)$$

4. The correction value calculation method according to claim 1, further comprising a correction step for correcting the 2-phase sinusoidal signals based on the correction values,
wherein the correction value calculation step is applied again to the 2-phase sinusoidal signals corrected by the correction step to update the correction values.

5. The correction value calculation method according to claim 4, wherein the correction values are updated using Equation (19).

$$C_x = C_x + G_f \cdot \Delta C_x \qquad (19)$$

$$C_y = C_y + G_f \cdot \Delta C_y$$

$$K_a = K_a + G_f \cdot (\Delta K_a - 1)$$

$$P_y = P_y + G_f \cdot \Delta P_y$$

where $$0 < G_f \leq 1.$$

6. The correction value calculation method according to claim 1, wherein the encoder is capable of detecting a wide range displacement that exceeds the displacement corresponding to one cycle of the 2-phase sinusoidal signals, and the correction value calculation method further comprises:
a wide-range phase angle calculation step for calculating the wide-range phase angle $\varphi_i$, which represents the wide range displacement corresponding to each phase angle $\theta_i$; and
a signal intensity correction signal intensity correction step that calculates the coefficients in the approximate expression model that expresses the squared radius $R^2$ as a trigonometric function of the wide-range phase angle $\varphi$ using the squared radius $R_i^2$ and the wide-range phase angle $\varphi_i$ by the least-squares method, calculates the signal intensity correction value corresponding to each wide-range phase angle $\varphi_i$ from the obtained coefficients, and corrects the squared radius $R_i^2$ corresponding to each wide-range phase angle $\varphi_i$ based on the signal intensity correction value, and
wherein, in the correction value calculation step, the correction values are calculated based on the corrected squared radius $R_{LCi}^2$, which is the squared radius $R_i^2$ corrected in the signal intensity correction step.

7. The correction value calculation method according to claim 6, wherein, in the signal intensity correction step calculation step, Equation (27) is used as an approximate expression model that expresses the square radius $R^2$ as a trigonometric function of the wide-range phase angle $\varphi$, $$R^2 = a_k \cos k\phi + b_k \sin k\phi + c_k \qquad (27)$$

the coefficients $a_k$ and $b_k$ are obtained as elements of the $R_k$ matrix by Equation (28), where k is an integer from 1 to $N_L$, and $N_L$ is the order of the highest harmonics used in the approximation, $$P_k = \begin{bmatrix} \sum \cos^2 k\phi_i & \sum \sin k\phi_i \cos k\phi_i & \sum \cos k\phi_i \\ \sum \cos k\phi_i \sin k\phi_i & \sum \sin^2 k\phi_i & \sum \sin k\phi_i \\ \sum \cos k\phi_i & \sum \sin k\phi_i & N \end{bmatrix} \qquad (28)$$

$$Q_k = \begin{bmatrix} \sum R_i^2 \cos k\phi_i \\ \sum R_i^2 \sin k\phi_i \\ \sum R_i^2 \end{bmatrix}$$

$$R_k = \begin{bmatrix} a_k \\ b_k \\ c_k \end{bmatrix}$$

$$P_k \cdot R_k = Q_k$$

$$R_k = P_k^{-1} \cdot Q_k$$

where $$k = 1, 2, 3, \ldots, N_L$$

the signal intensity correction value $R_{Ci}^2$ corresponding to each of the wide-range phase angles $\varphi_i$ is calculated from the obtained coefficients $a_k$ and b by using Equation (29), $$Rc_i^2 = \sum_{k=1}^{N_L} (a_k \cos k\phi_i + b_k \sin k\phi_i) \qquad (29)$$

and the corrected squared radius $R_{LCi}^2$ corresponding to each of the wide-range phase angles $\varphi_i$ is calculated by correcting the squared radius $R_i^2$ with the signal intensity correction value $R_{Ci}^2$ according to Equation (30).

$$R_{LCi}^2 = R_i^2 - Rc_i^2. \qquad (30)$$

8. A program that causes a computer to execute the correction value calculation method as claimed in claim 1.

9. A correction value calculation apparatus for calculating correction values to correct the 2-phase sinusoidal signals (X, Y) output by the encoder, comprising:
a polar coordinate conversion unit that calculates, for N phase angles $\theta_i$ and the Lissajous radius $R_i$ corresponding to each phase angle $\theta_i$ in the Lissajous waveform drawn by the 2-phase sinusoidal signals, the squared radius $R_i^2$, which is the square of the Lissajous radius $R_i$ corresponding to each phase angle $\theta_i$; and
an error detection unit that calculates, based on each phase angle $\theta_i$ and the squared radius $R_i^2$ corresponding to the phase angle $\theta_i$ calculated by the polar coordinate conversion unit, at least a correction residual $\Delta C_x$ of an offset error $C_x$ of the signal X, a correction residual $\Delta C_y$ of an offset error $C_y$ of the signal Y, a correction residual $\Delta K_a$ of an amplitude ratio error $K_a$ of the signals X and Y, and a correction residual $\Delta P_y$ of a phase difference error $P_y$ between the signal X and the signal Y, and then calculating correction values based on correction residuals, wherein the signals X and Y constitute the 2-phase sinusoidal signals, and the error detection unit obtains coefficients in an approximate expression model in which the squared radius $R^2$ is expressed by a trigonometric function including the phase angle $\theta$ as an argument by the least-squares method using each phase angle $\theta_i$ and the squared radius $R_i^2$ corresponding to each phase angle $\theta_i$, and the correction residual from the obtained coefficients.

10. The correction value calculation apparatus according to claim 9, wherein the error detection unit uses Equations (5) and (6) as the approximate expression model, $$R^2 = A_{c1}\cos\theta + A_{s1}\sin\theta + R_{o1} \quad (5)$$

$$R^2 = A_{c2}\cos 2\theta + A_{s2}\sin 2\theta + R_{o2} \quad (6)$$

obtains the coefficients $A_{c1}$ and $A_{s1}$ in Equation (5) as elements of the $C_1$ matrix using Equation (7), $$A_1 = \begin{bmatrix} \sum \cos^2\theta_i & \sum \sin\theta_i\cos\theta_i & \sum \cos\theta_i \\ \sum \cos\theta_i\sin\theta_i & \sum \sin^2\theta_i & \sum \sin\theta_i \\ \sum \cos\theta_i & \sum \sin\theta_i & N \end{bmatrix} \quad (7)$$

$$B_1 = \begin{bmatrix} \sum R_i^2\cos\theta_i \\ \sum R_i^2\sin\theta_i \\ \sum R_i^2 \end{bmatrix}$$

$$C_1 = \begin{bmatrix} A_{c1} \\ A_{s1} \\ R_{o1} \end{bmatrix}$$

$$A_1 \cdot C_1 = B_1$$

$$C_1 = A_1^{-1} \cdot B_1$$

obtains the coefficients $A_{c2}$ and $A_{s2}$ in Equation (6) as elements of the $C_2$ matrix using Equation (8), $$A_2 = \begin{bmatrix} \sum \cos^2 2\theta_i & \sum \sin 2\theta_i\cos 2\theta_i & \sum \cos 2\theta_i \\ \sum \cos 2\theta_i\sin 2\theta_i & \sum \sin^2 2\theta_i & \sum \sin 2\theta_i \\ \sum \cos 2\theta_i & \sum \sin 2\theta_i & N \end{bmatrix} \quad (8)$$

$$B_2 = \begin{bmatrix} \sum R_i^2\cos 2\theta_i \\ \sum R_i^2\sin 2\theta_i \\ \sum R_i^2 \end{bmatrix}$$

$$C_2 = \begin{bmatrix} A_{c2} \\ A_{s2} \\ R_{o2} \end{bmatrix}$$

$$A_2 \cdot C_2 = B_2$$

$$C_2 = A_2^{-1} \cdot B_2$$

and calculates the correction values from the obtained coefficients $A_{c1}, A_{s1}, A_{c2}$ and $A_{s2}$ using Equations (9) to (12).

$$\Delta C_x = A_{c1}/2 \quad (9)$$

$$\Delta C_y = A_{s1}/2 \quad (10)$$

$$\Delta K_a = \sqrt{1 - 2A_{c2}} \quad (11)$$

$$\Delta P_y = A_{s2}. \quad (12)$$

11. The correction value calculation apparatus according to claim 9, wherein the polar coordinate conversion unit calculates $x_i$ and $y_i$ obtained by approximating sine and cos $\theta_i$ using Equation (20) with A as the amplitude of the 2-phase sinusoidal signals as data representing the phase angle $\theta_i$, $$X_i/A = \cos\theta_i \equiv x_i \quad (20)$$

$$Y_i/A = \sin\theta_i \equiv y_i$$

the error detection unit uses Equations (5) and (6) as the approximate expression model, $$R^2 = A_{c1}\cos\theta + A_{s1}\sin\theta + R_{o1} \quad (5)$$

$$R^2 = A_{c2}\cos 2\theta + A_{s2}\sin 2\theta + R_{o2} \quad (6)$$

obtains the coefficients $A_{c1}$ and $A_{s1}$ in Equation (5) as elements of the $C_1$ matrix using Equation (21), $$A_1 = \begin{bmatrix} \sum x_i^2 & \sum x_i y_i & \sum x_i \\ \sum x_i y_i & \sum y_i^2 & \sum y_i \\ \sum x_i & \sum y_i & N \end{bmatrix} \quad (21)$$

$$B_1 = \begin{bmatrix} \sum R_i^2 x_i \\ \sum R_i^2 y_i \\ \sum R_i^2 \end{bmatrix}$$

$$C_1 = \begin{bmatrix} A_{c1} \\ A_{s1} \\ R_{o1} \end{bmatrix}$$

$$A_1 \cdot C_1 = B_1$$

$$C_1 = A_1^{-1} \cdot B_1$$

obtains the coefficients $A_{c2}$ and $A_{s2}$ in Equation (6) as elements of the $C_2$ matrix using Equation (23), $$A_2 = \begin{bmatrix} \sum (2x_i^2 - 1)^2 & \sum 2x_i y_i(2x_i^2 - 1) & \sum (2x_i^2 - 1) \\ \sum 2x_i y_i(2x_i^2 - 1) & \sum (2x_i y_i)^2 & \sum 2x_i y_i \\ \sum (2x_i^2 - 1) & \sum 2x_i y_i & N \end{bmatrix} \quad (23)$$

-continued $$B_2 = \begin{bmatrix} \sum R_i^2(2x_i^2 - 1) \\ \sum R_i^2 2x_i y_i \\ \sum R_i^2 \end{bmatrix}$$

$$C_2 = \begin{bmatrix} A_{c2} \\ A_{s2} \\ R_{o2} \end{bmatrix}$$

$$A_2 \cdot C_2 = B_2$$

$$C_2 = A_2^{-1} \cdot B_2$$

and calculates the correction residuals from the obtained coefficients $A_{c1}$, $A_{s1}$, $A_{c2}$, and $A_{s2}$ using Equations (9), (10), (26), and (12).

$$\Delta C_x = A_{c1}/2 \tag{9}$$

$$\Delta C_y = A_{s1}/2 \tag{10}$$

$$\Delta K_a = 1 - A_{c2} + \frac{1}{2} A_{c2}^2 \tag{26}$$

$$\Delta P_y = A_{s2}. \tag{12}$$

12. The correction value calculation apparatus according to claim 9, further comprising a correction unit that corrects the 2-phase sinusoidal signals based on the correction values,
wherein the polar coordinate conversion unit calculates squared radius $R^2$, which is the square of the Lissajous radius R corresponding to each phase angle θ, for the 2-phase sinusoidal signals corrected by the correction unit, and
the error detection unit calculates new correction values based on each phase angle θ and the squared radius $R^2$ calculated by the polar coordinate conversion unit and updates the correction values.

13. The correction value calculation apparatus according to claim 12, wherein the error detection unit updates the correction values using Equation (19).

$$C_x = C_x + G_f \cdot \Delta C_x \tag{19}$$

$$C_y = C_y + G_f \cdot \Delta C_y$$

$$K_a = K_a + G_f \cdot (\Delta K_a - 1)$$

$$P_y = P_y + G_f \cdot \Delta P_y$$

where $0 < G_f \leq 1$.

14. The correction value calculation apparatus according to claim 9, wherein the encoder is capable of detecting a wider range displacement than the displacement corresponding to one cycle of the 2-phase sinusoidal signals, and
the correction value calculation apparatus further comprises:
a wide-range phase angle calculation unit that calculates a wide-range phase angle $\varphi_i$ corresponding to a wide-range displacement for each phase angle $\theta_i$; and
a signal intensity correction unit that calculates the coefficients in the approximate expression model that expresses the squared radius $R^2$ as a trigonometric function of the wide-range phase angle φ using the squared radius $R_i^2$ and the wide-range phase angle $\varphi_i$ by the least-squares method, calculates the signal intensity correction value corresponding to each wide-range phase angle $\varphi_i$ from the obtained coefficients, and corrects the squared radius $R_i^2$ corresponding to each wide-range phase angle $\varphi_i$ based on the signal intensity correction value, and
wherein the error detection unit calculates correction values based on the squared radius $R_{LCi}^2$, which is the squared radius $R_i^2$ corrected in the signal intensity correction unit.

15. The correction value calculation apparatus according to claim 14, wherein the signal intensity correction unit uses Equation (27) as the approximate expression model that expresses the square radius $R^2$ as a trigonometric function of the wide-range phase angle φ, $$R^2 = a_k \cos k\phi + b_k \sin k\phi + c_k \tag{27}$$

obtains the coefficients $a_k$ and $b_k$ as elements of the $R_k$ matrix by Equation (28), where k is an integer from 1 to $N_L$, and $N_L$ is the order of the highest harmonics used in the approximation, $$P_k = \begin{bmatrix} \sum \cos^2 k\phi_i & \sum \sin k\phi_i \cos k\phi_i & \sum \cos k\phi_i \\ \sum \cos k\phi_i \sin k\phi_i & \sum \sin^2 k\phi_i & \sum \sin k\phi_i \\ \sum \cos k\phi_i & \sum \sin k\phi_i & N \end{bmatrix} \tag{28}$$

$$Q_k = \begin{bmatrix} \sum R_i^2 \cos k\phi_i \\ \sum R_i^2 \sin k\phi_i \\ \sum R_i^2 \end{bmatrix}$$

$$R_k = \begin{bmatrix} a_k \\ b_k \\ c_k \end{bmatrix}$$

$$P_k \cdot R_k = Q_k$$

$$R_k = P_k^{-1} \cdot Q_k$$

where $k = 1, 2, 3, \ldots, N_L$ calculates the signal intensity correction value $R_{Ci}^2$ corresponding to each of the wide-range phase angles $\theta_i$ from the obtained coefficients $a_k$ and $b_k$, by using Equation (29), $$Rc_i^2 = \sum_{k=1}^{N_L} (a_k \cos k\phi_i + b_k \sin k\phi_i) \tag{29}$$

and calculates the corrected squared radius $R_{LCi}^2$ corresponding to each of the wide-range phase angles $\varphi_i$ by correcting the squared radius $R^2$ with the signal intensity correction value $R_{Ci}^2$ according to Equation (30).

$$R_{LCi}^2 = R_i^2 - Rc_i^2. \tag{30}$$

16. An encoder comprising:
the correction value calculation apparatus as claimed in claim 9; and an encoder detection unit that outputs 2-phase sinusoidal signals in response to displacement along the measurement direction, wherein the correction value calculation apparatus performs:
- a correction value calculation process that calculates correction values based on the 2-phase sinusoidal signals output by the encoder detection unit; and
- a correction process that applies the calculated correction values to the 2-phase sinusoidal signals output by the encoder detection unit.

* * * * *